United States Patent [19]
Dunstan et al.

[11] Patent Number: 5,560,022
[45] Date of Patent: Sep. 24, 1996

[54] POWER MANAGEMENT COORDINATOR SYSTEM AND INTERFACE

[75] Inventors: Robert A. Dunstan, Beaverton; Marion H. Shimoda, Aloha; Kelan C. Silvester, Portland, all of Oreg.; Jiming Sun, Spring, Tex.

[73] Assignee: Intel Corporation, Santa Clara, Calif.

[21] Appl. No.: 278,054

[22] Filed: Jul. 19, 1994

[51] Int. Cl.$^6$ .................................................. G06F 1/32
[52] U.S. Cl. ................................. 395/750; 395/752
[58] Field of Search ............................. 395/750; 364/207

[56] References Cited

U.S. PATENT DOCUMENTS

| | | | |
|---|---|---|---|
| 4,747,041 | 5/1988 | Enget et al. | 395/750 |
| 5,283,905 | 2/1994 | Saadeh et al. | 395/750 |
| 5,291,607 | 3/1994 | Ristz et al. | 395/750 |
| 5,349,668 | 9/1994 | Gladstein et al. | 395/750 |
| 5,404,546 | 4/1995 | Stewart | 395/750 |
| 5,408,669 | 4/1995 | Stewart et al. | 395/750 |
| 5,410,711 | 4/1995 | Stewart | 395/750 |
| 5,414,860 | 5/1995 | Canover, Jr. et al. | 395/750 |

*Primary Examiner*—Jack B. Harvey
*Assistant Examiner*—David A. Wiley
*Attorney, Agent, or Firm*—Blakely, Sokoloff, Taylor & Zafman

[57] ABSTRACT

A power management system and interface providing a flexible and uniform protocol for controlling power management within a computer system including various software layers and add-in components. Clients (registered system elements) requiring power management notification and control become registered (via an associated software component) with a power management coordinator (PMC). The PMC provides information routing functions and address translations to facilitate communication (including power consumption information) between clients at registered identifiers. A programmable power policy manager allows a user to define a performance/economy setting for the system that is communicated to all registered devices so that dwell and decay times are appropriately set by the device. A programmable event sequencer maintains an event notification sequence and control sequence for power events. A programmable power budgeter maintains and allocates power on a request basis for system elements. A programmable thermal budgeter maintains and allocates energy based on thermal considerations. A BIOS interlace couples for communication between an APM BIOS (if present) to send commands and poll for and receive event notification. Registered extensions may be used to provide alternate functionality for the sequencer, the power policy manager, and the thermal and power budgeters. The PMC provides for communication of power status, events, and other information between registered devices and allows registered software applications to originate power events. Other extensions may register to enhance power management.

16 Claims, 11 Drawing Sheets

POWER MANAGEMENT COORDINATOR SYSTEM AND INTERFACE

BACKGROUND OF THE INVENTION (1) Field of the Invention

The present invention relates to the field of power management and conservation within a computer system.

(2) Prior Art

The importance of power management for computer systems is growing as computer systems become complex and the need to conserve power within the components of a computer system becomes more critical. This is particularly true regarding laptop and other portable or battery operated computer systems. Interest in power management continues to grow in the computer community for both battery-operated systems and AC-powered desktops (so-called "Green" "PCs"). By reducing power consumption, not only is battery lifetime prolonged, but energy is conserved and heat generation is reduced.

Heretofore, systems have been implemented for power management features for IBM compatible computer systems that utilize a BIOS (or Basic Input/Output System firmware) for controlling the computer components that are located within the "motherboard" of the computer system or components that are delivered to the end user with the motherboard. As is well known in the computer industry, the BIOS is able to place the computer components into several power reduction states (e.g., standby, suspend, etc.). While this is useful for controlling the power consumption of the motherboard components (and components shipped with the computer to the end user), what is needed is a system for controlling the power management and other related functions of the entire computer system including add-in cards (e.g., PCMCIA devices). PCMCIA is a well known standard interface for computer systems and peripherals. These add-in cards are added by the user after purchase and are typically not power managed by the system. The present invention offers the advantageous functionality for providing a uniform power management system for add-in cards of a computer system that greatly expands the power management capabilities of the BIOS.

An APM (Advanced Power Management) BIOS was introduced to facilitate power management within computer systems. While useful for certain systems, the APM BIOS utilizes very complex connections and most importantly no software component or device (aside from the APM BIOS) could initiate a power management event (such as a shut down request) without going through the APM BIOS. Further, since the APM BIOS power management is located within the firmware, power down events initiated by the APM BIOS are not always responded to well by application programs (e.g., time dependent programs) running on the computer when power down is implemented. Therefore, what is needed is a mechanism to facilitate the initiation of a power management event from a software component. What is needed is a system that allows and recognizes power management events that originate from a software component, such as an application program. The present invention provides such advantageous functionality.

Accordingly, it is an object of the present invention to provide a power management system and interface for a computer system that responds to and manages add-in devices that are integrated with the system by a user. Further it is an object of the present invention to provide such a system that is flexible and easily responds to new devices added to or removed from an existing system. It is also an object of the present invention to provide such a power management system with extremely flexible and programmable power management policies. It is another object of the present invention to provide a power management system capable of responding to a power management event originating from an application program. It is also an object of the present invention to remain backward compatible with the APM BIOS power management systems. These objects of the present invention and others not specifically recited herein will be become clear within further discussions to follow.

SUMMARY OF THE INVENTION

A power management system and interface providing a flexible and uniform interface for controlling power management within a computer system including various software layers and add-in components is described. Clients (registered system elements) requiring power management notification and control become registered (via an associated driver) with a power management coordinator (PMC). The PMC provides information routing functions and address translations to facilitate communication (including power consumption information) between clients at registered identifiers. A programmable power policy manager allows a user to define a performance/economy setting for the system that is communicated to all registered devices so that dwell and decay times are appropriately set by the device. A programmable event sequencer maintains an event notification sequence and control sequence for power events. A programmable power budgeter maintains and allocates power on a request basis for system elements. A programmable thermal budgeter maintains and allocates energy based on thermal considerations. An APM BIOS interface couples for communication between an APM BIOS (if present) to send commands and poll for and receive event notification. Registered extensions may be used to provide alternate functionality for the sequencer, the power policy manager, and the thermal and power budgeter. The PMC provides for communication of power status, events, and other information between registered devices and allows registered software applications to originate power events. Other PMC extensions may register to participate in and enhance power management.

Specifically, embodiments of the present invention include, in a computer system including a bus for communicating address and data information, a central processor coupled to the bus for executing instructions and processing data, memory coupled to the bus for containing information, and a plurality of system devices including add-in devices coupled to communicate within the computer system, a power management coordinator comprising: a plurality of power management device drivers coupled to communicate with the add-in devices; power management means coupled to communicate with the plurality of power management device drivers, the power management means for receiving power management communications from originator device drivers and for routing the communications to destination device drivers; and a power policy manager means coupled to communicate with the power management means, the power policy manager means for issuing power management events for the add-in devices utilizing a uniform power management protocol adopted by the device drivers.

Embodiments of the present invention include the above wherein the add-in devices provide programmable dwell time and decay time periods and wherein the power policy manager means comprises: means for allowing selection of a power managed state between performance and economy for operation of the computer system; and means for communicating the power managed state to the device drivers and, in response thereto, individual add-in devices are for adjusting associated dwell time and decay time periods.

Embodiments of the present invention include the above and further comprising a thermal budgeter means coupled to the power management means, the thermal budgeter means for maintaining a record of power consumption of the system devices and for controlling distribution of system power based on predetermined heat capacities of the system and a power budgeter means coupled to the power management means, the power budgeter means for monitoring power consumption of system devices and for allocating system power based on a power supply capacity of the computer system.

The present invention also includes a method for use in accordance with the above.

DETAILED DESCRIPTION OF THE INVENTION

Figure 1:
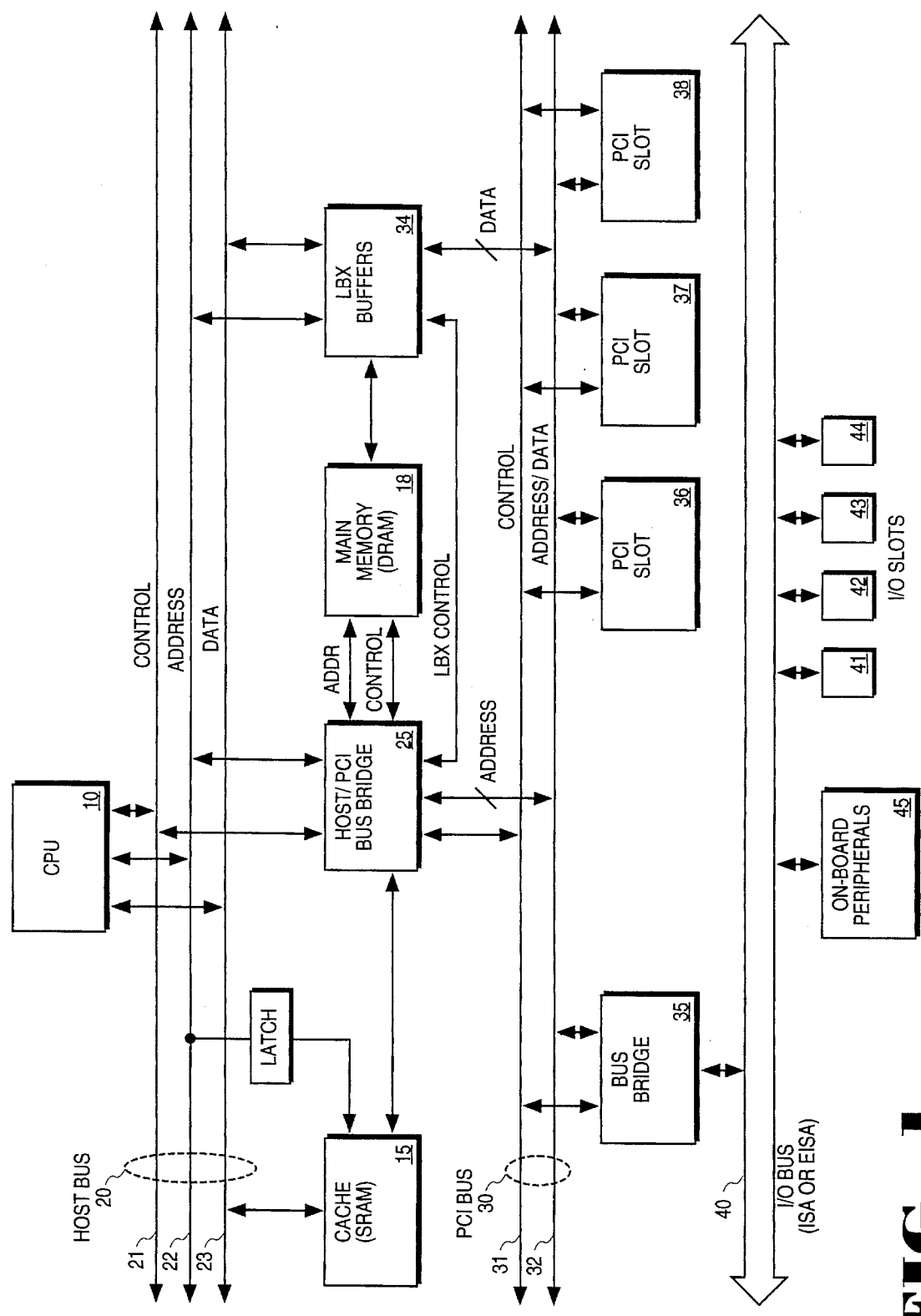
FIG. 1 is a block diagram of a computer system implemented within the present invention showing the bus architecture, PCI slots, and other elements.

Generally, the present invention is drawn to a power management system that provides a uniform mechanism for providing communication between applications and devices within the system for power management. The power management coordinator (PMC) of the present invention is capable of registering software units (e.g., modules) that each are programmable and provide a variety of different power management functions. Each add-in device to the system and its device driver "register" with the PMC in order to allow communication between the device and a "power policy manager" module that provides instructions to the device regarding the currently selected power management policy of the system. Other modules that may be added to communicate with the PMC include a "thermal manager" for managing the devices of the system to control the internal heat production of the system, a "power sequencer handler" module for providing a proper sequence with which to notify the devices of the computer system of power management events, and a "power budgeter" module for controlling the system's devices so that adequate power is maintained for requested operations. In accordance with the PMC of the present invention, application programs operating within the system may, in addition to the APM BIOS and the power policy manager, originate power management events, including system suspend and shut down events. The present invention can communicate with registered devices to obtain their available power management capabilities, obtain their current settings and update them. Registered clients to the PMC can use the PMC as a communication channel or pass through.

The present invention offers users a single, comprehensible view of power management and a central location from which to control system Power Management (PM) behavior within a computer system including add-in devices. From a single power management control panel, devices of the computer system can be individually controlled within the present invention. The control panel of the present invention, as discussed to follow, provides the user with a selection between power conservation states and system performance. The more conservation ("economy") is required the less performance is maintained, etc. In addition to the above, in one embodiment the control panel also allows selection of the maximum latency time (restart time) the user is willing to accept from a suspend or sleep state.

In the following detailed description of the present invention, numerous specific details are set forth in order to provide a thorough understanding of the present invention. However, it will be obvious to one skilled in the art that the present invention may be practiced without these specific details. In other instances well known methods, procedures, components, and circuits have not been described in detail as not to unnecessarily obscure the present invention. Further, embodiments of the present invention are discussed in terms of a particular implementation of software and hardware (e.g., an IBM compatible system), however, it is appreciated that the present invention is equally applicable to other computer systems and formats (e.g., Apple, Power PC, DEC Alpha, etc.) and that the present invention should not be construed as limited to the IBM compatible format.

COMPUTER SYSTEM

Referring now to FIG. 1, a computer system architecture which may incorporate the present invention is illustrated. The computer system of the present invention as shown in FIG. 1 may be of a desktop implementation or may be of a battery powered implementation (e.g., laptop, portable, handheld, etc.). The computer system architecture of FIG. 1 is illustrated so as to highlight its hierarchical bus organization. The computer system's central processing unit (CPU) 10 communicates with its SRAM cache 15 over a host bus 20. In one embodiment, the host bus 20 includes control lines 21, address lines 22 and data lines 23. In other embodiments, the address and data lines may be multiplexed to share common signal paths. A host bus 20 is usually designed to meet the needs of high performance computing associated with whatever type of processor is implemented for CPU 10.

In some computer system architectures, the computer system's main memory 18 will be directly coupled to the processor host bus. In the illustrated implementation, the DRAM main memory 18 is coupled to the host bus through the host/PCI bus bridge 25. The host/PCI bus bridge 25 is used as a bridge between the host bus 20 and the system's PCI bus 30. The PCI bus, as described above, serves as the primary I/O bus and was designed to address the growing industry needs for a standardized local bus that is not directly dependent on the speed and size of a computer system's processor bus. The PCI bus 30 as illustrated in FIG. 1 is shown separated into control lines 31 and address/data lines 32. The host/PCI bus bridge 25 monitors the host bus 20 and the PCI bus lines 31 and 32 and determines whether a transaction is designated for the computer system's main memory system 18 or whether a CPU request should be propagated down the hierarchy of buses, the next step being down to the PCI bus 30.

Coupled to the PCI bus 30 in FIG. 1 are three PCI slots 36, 37 and 38 for receiving peripheral devices designed to be compatible with the PCI bus standard. Such add-in cards may include graphics accelerators, disk drive controllers, disk drives, communications devices, memory devices, and other speed sensitive peripherals which may take advantage of the abilities of the PCI local bus 30. These add-in peripherals used within the present invention may be of a number of different well known types, one of which is called PCMCIA peripherals. The present invention PMC is designed such that each peripheral, such as a PCMCIA peripheral ("peripheral"), attached to the computer system registers (receives a unique identifier) and communicates with the PMC in order to receive and transmit PM events with the PMC. The device and its driver may register with the PMC. Internally, the PMC communicates power management policy to the device in order to bring the device into a power management stage in compliance with the total system. Devices can communicate with all other registered devices and registered software extensions to receive PM status and for originating PM events for getting/setting device capabilities, parameters, etc.

Coupled between the address/data lines 32 of the PCI bus and the host bus 20, a collection of buffers, denoted LBX buffers 34 are used to buffer data transfers between the two buses 20 and 30 and are not particularly pertinent to the present invention. The buffers 34 are implemented to compensate for the varying speeds that the two buses may be operating at and enhance system performance by allowing for concurrency between the host bus 20 and PCI bus, giving each greater bus throughput and decreased latency.

In FIG. 1, a secondary I/O bus 40 which in alternative embodiments may be a peripheral I/O bus compatible with the ISA or EISA standards, or other peripheral bus standards is shown. Coupled to the I/O bus 40 are four I/O slots 41, 42, 43 and 44 which may be used for receiving various peripherals. On-board peripherals 45 such as floppy disk drives, hard disk drives equipped with an IDE standard interconnect, and other peripherals normally associated with computer systems are often designed right on the system's motherboard and do not require an I/O slot which are provided for other add-in card upgrades. These elements may typically be controlled by a BIOS, including their power management. The on-board peripherals 45 do electrically reside and the secondary I/O bus 40. In general, the I/O bus 40 is a slower bus than the PCI bus 30 but is still included in newer generation computer systems to maintain compatibility with previously designed peripherals.

Having both an ISA bus and a PCI bus allows personal computer platforms built around the PCI bus as a primary I/O bus to leverage the large ISA product base. The ISA bus provides 24-bit addressing and a 16-bit datapath. An EISA I/O bus allows a personal computer platform built around the PCI bus as a primary I/O bus to leverage the large EISA/ISA product base. Along with compatibility for 16-bit and 8-bit ISA hardware and software, the EISA bus provides for 32-bit addressing and a 32-bit datapath. Other secondary I/O buses may provide similar features. A bridge bus 35 is coupled between the PCI bus 30 and the secondary I/O bus 40 of the computer architecture of FIG. 1 as illustrated. The bus bridge 35 may incorporate the logic for interfacing the secondary I/O bus 40 with the PCI bus 30 as well as incorporating support for any necessary DMA controllers and interrupt control logic.

DEVICE CONTROL MODEL

An important requirement for controlling system power management (PM) behavior is the ability to control individual device PM behavior. This section describes four device-independent parameters used by the present invention for controlling device PM behavior. Any system PM behavior can be achieved using these four parameters which are controlled by the present invention.

The two main parameters of a device's physical behavior (related to PM) are its (1) power consumption and its (2) response latency. Power consumption is the amount of power that the device uses. Response latency is a measure of how much extra time this device needs to be accessed when in a lower power state (e.g., some state less than fully powered up). For instance, a disk drive often requires extra time to spin-up before it can be accessed after having been spun-down to reduce power consumption or heat. However, response latency does not include normal delays associated with the device when it is in a full on state (e.g., regarding the disk drive, seek time and transfer times are not part of latency).

Figure 2:
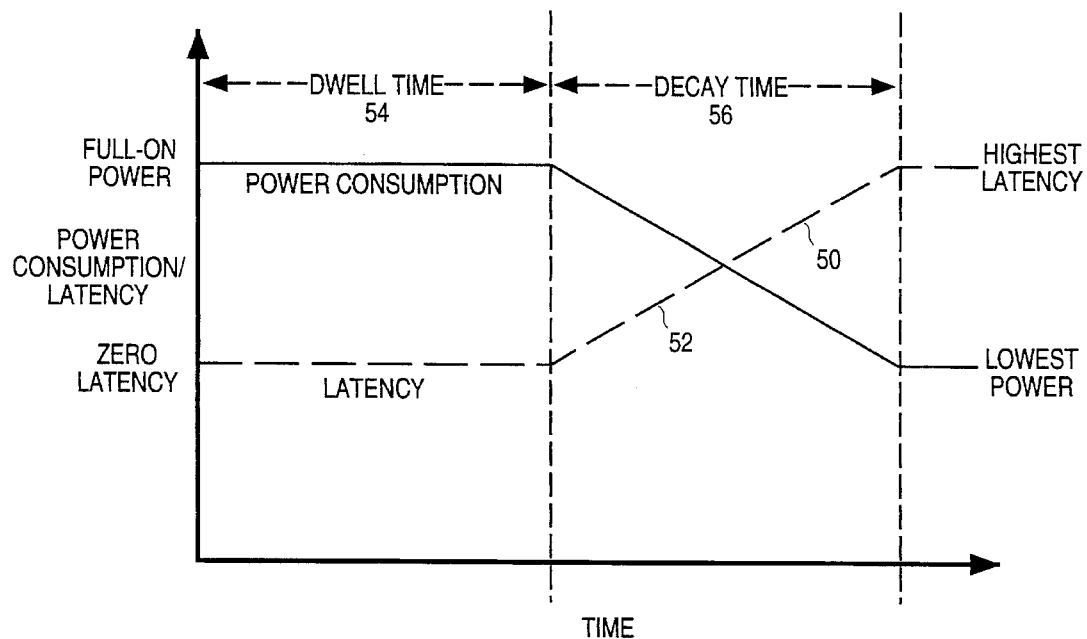
FIG. 2 is a graph illustrating relationships between power management characteristics including dwell time, decay time, power consumption and latency used by the present invention.

As shown in FIG. 2, power consumption and response latency in a device can be inversely related in typical circumstances. When a device is in its full on state, response latency is, by definition, zero. As shown in FIG. 2, when a device is in lower power state, its response latency is typically longer then zero, with lower power consumption translating to higher latency.

Dwell time and decay time are also remaining PM control variables that pertain to devices. Dwell time controls the length during which the device stays at full power after its last activity until it starts decreasing its power consumption. During this dwell time, the device is at full availability and there are no latency delays. Decay time controls the amount of time a device takes to transition within its self-managed state from its highest power consumption level to its lowest power consumption level.

FIG. 2 illustrates the relationship between these four parameters for a typical device (e.g., circuit or peripheral). The horizontal axis illustrates time measured from when the device was accessed. The vertical axis shows both power consumption 52 of the device and the device's access latency 50. During the dwell time period 54, power consumption is at its highest level, and latency is at its lowest level. Once the dwell time period has elapsed, the device begins to reduce its power consumption (with a resulting increase in latency) such that after a decay time period 56 has elapsed, the device has reached its lowest power state. It is appreciated that typical devices modeled by FIG. 2 may have a small set of states between their fully on and fully off power states.

Power states. The following discusses the power management states shown in FIG. 3A for devices within the control of the present invention. Them am three possible power managed states in the self managed model. (1) In the off state 60 the device is shut down and will reject normal accesses. No power is consumed and the state of the device is not preserved. Resources used by a device in this state can be reassigned. (2) In self power managed states 62c, the device can be accessed normally and will internally adjust its power consumption to respond to an access. Different devices can provide different levels of power managed states that can be distinguished by their response latency and power consumption characteristics. Power managed stages may exist between fully on (shortest latency response/largest power consumption) and standby (longest latency response/lowest power consumption). (3) In the suspend state of a device 64, any internal device-specific data is preserved and power can be removed from the device. The device will assume that the operating system is not running in a normal fashion and that accesses will not be made of the device. If an access is made, the device can reject it using accepted practices or standards for the device.

Figure 3A:
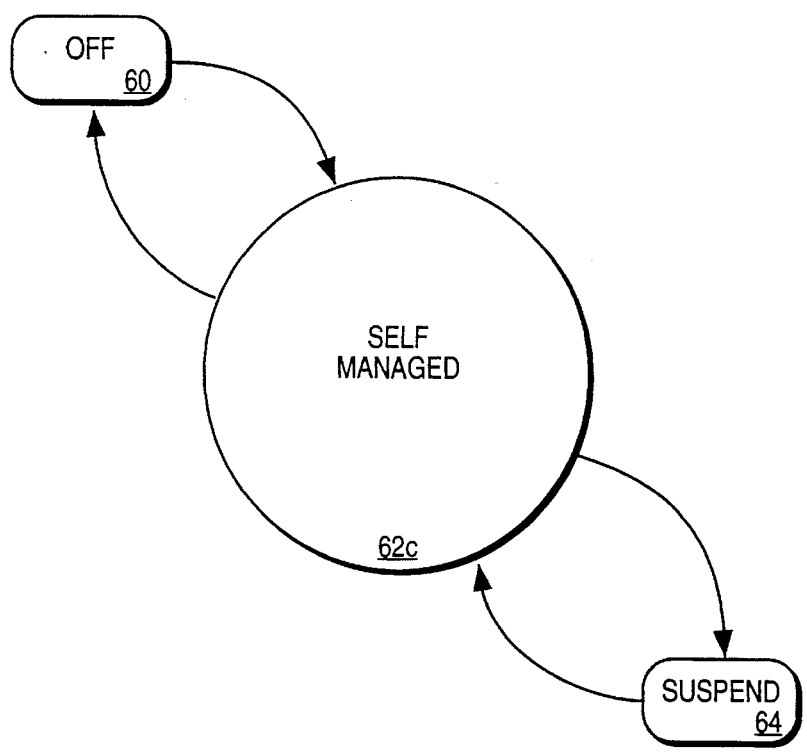
FIG. 3A is a state illustration showing possible transitions for self managed power states within the present invention.

In the self managed power management mode, as shown in FIG. 3A, the PMC does not intervene when a state transition is made by the device and its driver. In effect, the device and its driver are completely responsible for making the state transition based on its timers, a set of system events to which it responds, and/or power goals. However, the device and its driver must still handle the system power events that are sent via the PMC. The PMC of the present invention may maintain timers for the device if requested.

Figure 3B:
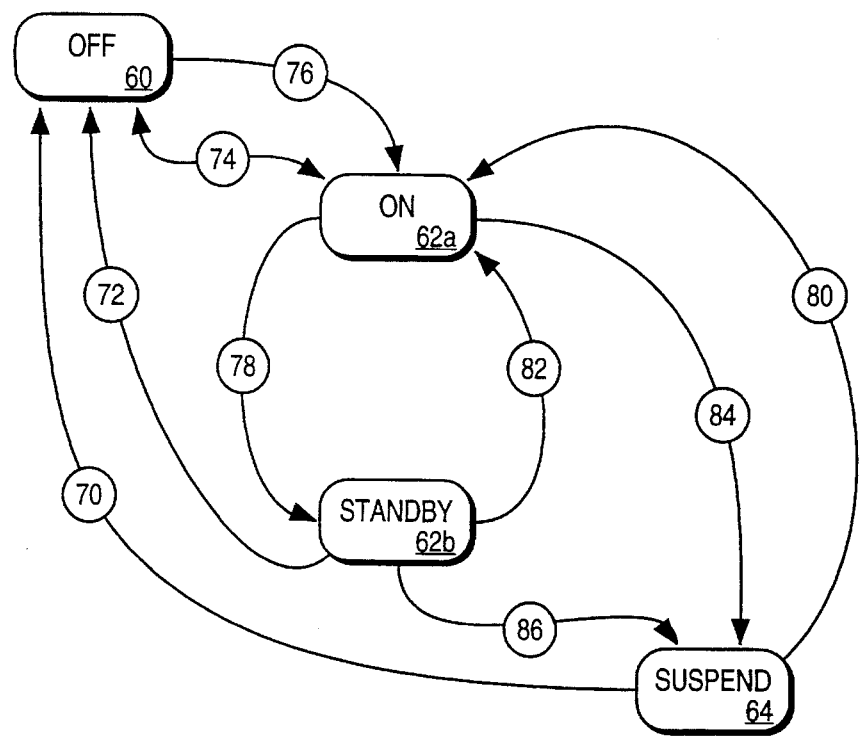
FIG. 3B is a state illustration showing possible transitions between the off state, the power managed state and the suspend state for a restricted state device within the present invention.

As shown in FIG. 3B, the controls over a logical device's power managed transitions can be set to force a logical device to remain in one of two extremes (on and standby). When on, the device can be instantly used with no response latency and consumes the most power. When in standby, the device is conserving power while still being able to be accessed with a corresponding access latency. The PMC in the restricted mode can still force state transitions on the device according to its global power management policy. Within the present invention, in the restricted power managed mode, the device and its driver only makes a state transition when it receives the state-change command from the PMC.

The following exemplary transitions are represented in FIG. 3B. Transition 70 corresponds to a power button pressed causing transition from suspend 64 to off 60. Transition 72 corresponds to a power button pressed causing transition from standby to off 60. Transition 74 corresponds to a power button pressed from on 62a to off 60. Transition 76 corresponds to a power button pressed causing transition from off 60 to on 62a. Transition from off 60 always goes to the on 62a state. Power policy may cause the device to quickly transition to standby 62b. Transition 78 corresponds to a standby event notification from the PMC of the present invention causing transition from on 62a to standby 62b. Transition 86 corresponds to a suspend event notification via the PMC causing transition from standby 62b to suspend 64. The amount of time spent in the standby 62b state may vary and may be very short (even zero). Transition 82 corresponds to a user activity detected or transition "command" from the PMC of the present invention causing transition from standby 62b to on 62a. Transition 80 corresponds to a resume event notification via the PMC causing transition from suspend 64 to on 62a. And transition 84 corresponds to a suspend 64 event notification via the PMC causing transition from on 62a to suspend 64.

POWER MANAGEMENT COORDINATOR

Figure 4:
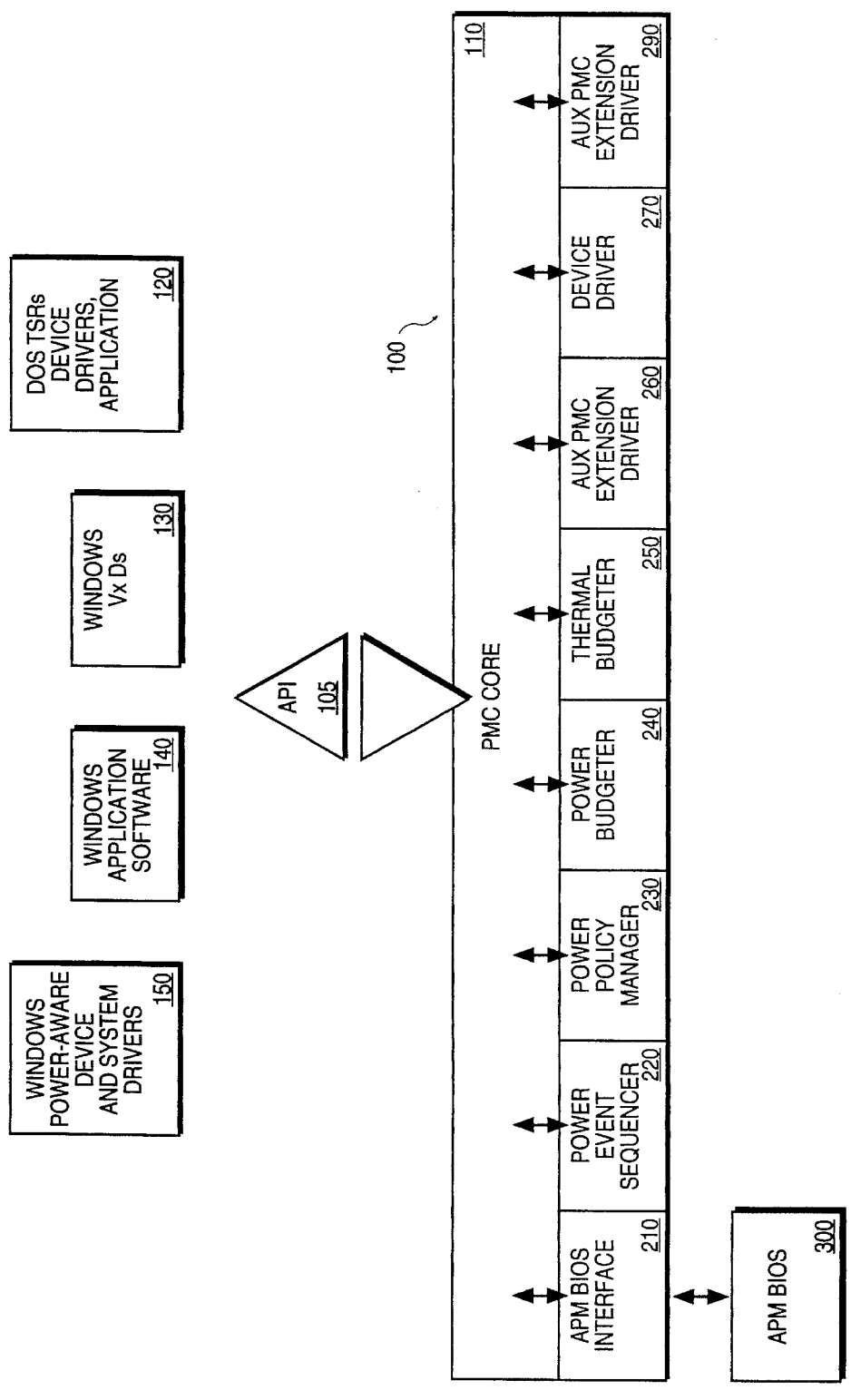
FIG. 4 is an overall block diagram of the power management coordinator of the present invention showing the communication interfaces, the API, the PMC core and the coupling of various modules, extensions and device drivers.

Refer to FIG. 4 where the power management coordinator (PMC) 100 is shown. The PMC 100 provides basic services such as polling for power events, power event notification, and interface with OS components (applications, device drivers, and VxDs). The PMC 100 of the present invention is composed of multiple power management components 210–290 coupled the PMC core 110 and a API (application programming interface) module 105 for communication between the PMC core and various other software layers. The PMC core and its extension modules of the present invention are now described. The PMC core module 110 is the centerpiece of the PMC 100 and provides basic services such as handling the API interface 105 with operating system components (applications, device drivers, and VxDs). The PMC core 110 may be interpreted as a large communication channel, with automatic address translation, that provides information flow between the attached modules and extensions and the other computer system applications. When the PMC 100 receives a call, it steers it to the appropriate registered device or extension via its registered identifier, or handles the call itself as necessary (depending on the specific API call).

The PMC 100 provides a uniform communication mechanism for devices registered with the PMC and also provides a uniform power management protocol for add-in devices (that become registered). Although the PMC 100 offers a uniform power management protocol, it is extremely flexible because the modules, extensions and drivers, as will be discussed below, are fully programmable and selectable.

An important feature of the PMC 110 core is address translation. As will be discussed to follow, devices coupled to the computer system (e.g., add-in cards, applications, TSRs) may register with the PMC 110 and will receive a unique identifier for communication. Once assigned an identifier, the PMC core 110 provides a pathway for two-way communication between these devices, without requiring the devices to determine the particular software layer of the target device. As part of the communication pathway, the PMC core 110 performs the required translation between the various layers of software and/or interfaces. For instance, a windows™ virtual device (VxD) driver 130 may communicate to a DOS TSR 120 via the PMC core 110 by knowing solely the registered identifier of the DOS TSR as assigned by the PMC core 110. Both the VxD driver 130 and the DOS TSR 120 need to the registered with the PMC core 110, but once registered, the PMC core 110 performs all the required address and routing translation to allow these devices to communicate through the PMC 100.

The advantage of the above communication routing mechanism of the present invention is that a registered device need not know the particular software layer or addressing scheme of another registered device in order to communicate with that device. The registered device need only known the identifier assigned to the other registered device by the PMC core 110 and the PMC core 110 performs the needed routing. Via a request command, each device can determine the registered identifiers of the other devices. For example, a particular device driver 270 is shown coupled to and registered with the PMC core 110. Assuming another registered unit is a DOS TSR 120, the DOS TSR 120 may send a status request of the registered device to the PMC core 110. The core 110 will interpret the request and translate the proper addressing required to forward the request to the device and when the device responds, will forward the status information back to the DOS TSR 120. The API Function section to follow illustrates communicate functions implemented by the PMC, of the present invention and made available for registered units.

The PMC core 110 of FIG. 4 is coupled to communicate to various applications that operate within the computer system of the present invention. The PMC core 110 can communicate with Windows™ power-aware device drivers and other system drivers as shown by 150 via the PMC API 105. Also, the PMC core 110 can communicate with Windows™ application software 140. Regarding the above, the PMC core 110 can receive various communication requests, status requests, or power events from the above applications 140 and drivers 150. The PMC core 110 can communicate with Windows™ VxDs 130, and with DOS TSRs, device drivers, and applications generally 120 as discussed above. This communication is maintained via the application programming interface (API) 105 of the present invention. The PMC core 110 can direct these applications in to a standby mode wherein information is saved in anticipation of a power reduction state. Further, these applications (140 and 120 for instance) can originate or initiate a power reduction state. The PMC core 110 also provides for communication between these applications and the APM BIOS 300.

The particular and exemplary functionality of the PMC 100 of FIG. 4 is described in detail in the API Function section. Coupled to the PMC core 110 are several modules that are utilized by the PMC 100 of the present invention to provide power management. Aside from the power event sequencer 220, different modules are optional. As discussed, each add-in device coupled to the computer system will become registered with the PMC 100 by notifying the PMC 100 of its presence and in effect it joins its device driver with the PMC 100, see for instance device driver 270 joined with PMC core 110. There are a number of well known communication standards communication to and with a device driver 270 and any number of communication methodologies may be utilized by the present invention. Aside from registered device drivers 270, auxiliary PMC extensions 260 may be registered with the PMC core 110. These provide alternative power management capabilities and may serve as alternate modules for the modules 210, 220, 230, 240, and 250 (as will be described to follow). The elements (e.g., modules, extensions, budgeters, sequencers, managers, device drivers, APM BIOS, etc.) that register with and couple to communicate with the PMC core 110 are called "clients." Each client of the present invention adopts and recognizes the uniform power management communication protocol of the PMC 100. Each client can translate this protocol to the particular command format recognized by its associated device.

An APM BIOS interface driver 210 is coupled to communicate with the PMC core 110 and the APM BIOS 300 (if it exists within the particular computer system) in order to provide total backward compatibility with the APM BIOS. The APM BIOS version 1.1 (or later) is able to cooperate more in power management with the PMC 100 of the present invention because this version of APM BIOS refrains from taking any actual power management steps without software approval from the PMC 100. However, earlier versions of APM BIOS must be disabled and enabled from power management to perform similarly. In particular, the power policy manager 230 may be configured to implement power management according to the APM BIOS instructions for backward compatibility. In this configuration, the PMC 100 searches for a driver (VPOWERD.386) supplied within by Windows™ v3.1 (or later versions having similar functionality) and if found will register the driver as driver 210. The APM BIOS interface 210 is responsible for polling the APM BIOS 300 to determine the current state of power management registers, etc., and communicating this information to the PMC core 110. Therefore, the APM BIOS 300 is able to initiate a power management event, and communicate this information to the PMC 100 and then to the rest of the system.

The APM BIOS 300 is able to place the devices of the motherboard into a standby mode when the computer system components that it monitors appear idle for a given period of time. In this mode, several devices may prepare for a power down in a well known fashion. The APM BIOS 300 communicates (via polling of the APM BIOS interface 210) this information to the present invention as a power management event. The PMC core 110 communicates the standby condition to all registered devices so that the entire system (applications, devices, drivers, etc.) can prepare for a possible power down. If the system continues in this state, after a second time period the APM BIOS 300 will place the system into a suspend state where the devices of the computer system appear as powered down and typically a push button or other user action is required to restore the system to an operational state.

Generally, the APM BIOS interface driver 210 of FIG. 4 performs the following tasks: (1) handles (e.g., connects with, disconnects from) with the APM BIOS; (2) polls the APM BIOS 300 periodically for power management events and if these events are found, the driver calls the PMC 100 in order to broadcast the event throughout the system; (3) handles calls to the APM BIOS 300 from the API 105 allowing communication between the APM BIOS 300 and other units of the computer system that are registered with the PMC core 110; and (4) handles updating the system clock when coming out of a suspend, and power event update time notification for APM BIOS version 1.1 (or later).

Depending on the particular power policy manager 230 in use, the PMC 100 of the present invention may take total instruction from the APM BIOS 300 and power down the registered add-in devices upon receiving the suspend condition. This would be a backward compatible mode. However, if the power policy manager 230 was programmed alternatively, it could disable the APM BIOS 300 (if present) from taking independent action to perform power management unless given authority from the PMC. In such case, application programs, drivers and add-in devices that are registered with the PMC core 110 can be notified upon the standby signal and requested by the PMC core 110 for shut down authority. The registered units then respond to the PMC core 110 with an allowance or delay (rejection) of shutdown. If all the registered units respond with a shut down allowance, then the power policy manager 230 will generate the actual power management event (for powering down) upon the APM BIOS signaling a suspend operation. In an alternative embodiment, the PMC 100 of the present invention can ignore the APM BIOS 300 suspend because a particular registered device is not allowing shut down. At this the APM BIOS 300 is prevented from suspending and the registered devices are not powered down.

The power event sequencer 220 of the present invention is coupled to communicate with the PMC core 110 and is required to correctly handle the distribution of power events in a particular sequence (e.g., order) that is programmable within the module 220. The sequence contains a listing of the PMC clients including the particular add-in components in a particular notification order. The listing contains the most effective and efficient sequence in which these devices should receive power management events. For instance, the sequence can outline the most accurate way in which to power these systems down without loss of information or without overly burdening the power supply for those components that require additional energy for power down, if applicable. In an example, the power event notification sequence can list applications before devices so that applications may save their data on disk before the disk drive is powered down. The default power event sequencer 220 can be replaced to enhance the default power event notification process. A replacement sequence may be registered as an auxiliary PMC extension, 290 however, only one extension is recognized by the PMC core 110 at any given time.

A power policy manager 230 of FIG. 4 maintains the current state of the user selected power policy. This policy, as will be discussed below in further detail, allows selection between high performance operation and power conservation. The more the performance, the lower the conservation and vice-versa. The policy manager 230 communicates with each of the registered devices and drivers (e.g., 260, 270 and 290) to communicate the currently selected power management policy to each registered device using the uniform power management communication protocol. The registered driver is then able to translate this policy state into a configuration recognized by the device. The power management command can instruct the device to enter the appropriate power managed state.

The power policy manager 230 of FIG. 4 also monitors the activity of each registered device to the PMC core 110 in order to perform global (e.g., system wide) power management and can originate a power management event. This activity monitoring may be performed in a number of different mechanisms, one of which is to monitor device I/O (e.g., by monitoring interrupt activity or by monitoring data I/O traffic from the device). The registered device driver for a particular device may contain information regarding idle characteristics of the device and will relay this information, when requested, to the PMC 100 and to the power policy manager 230. Therefore, the policy manager 230 can monitor these idle characteristics on a device by device basis. For instance, if the registered device is an application program, the registered device may indicate certain function calls that are performed at an idle prompt and the policy manager 230 can monitor the computer system to determine if these functions calls are being performed without any intervening activity. In essence, the power policy manager is flexible in that the idle characteristics for a given device may be programmed by the registered device driver for that device and communicated to a programmed within the power policy manager 230. After a given period of inactivity, the power policy manager 230 can then issue a global power management notification based on the power event sequencer 220 and if all devices respond to allow the event, the power policy manager 230 can issue a power management event (e.g., for power reduction) that is communicated, via the sequencer, to all registered devices, including the APM BIOS 300.

A power budgeter 240 can be added within the PMC 100 of the present invention for managing the power available for the components of the computer system. By monitoring and controlling which devices of the computer system are active at any given time, the power budgeter guarantees that there is adequate power to perform the requested tasks of the user. Generally, device drivers 270 communicate their power usage and on going power requests to the power budgeter 240. The budgeter 240 issues power resources to the device drivers. The power budgeter 240 also provides advanced warning to a user in the event that there is not enough power available to the system to perform the requested tasks. The power budgeter 240, as will be discussed to follow, communicates with registered drivers (if present) that are associated with smart batteries (if present) for battery operated computer systems. By monitoring battery levels, the power budgeter 240 guarantees that there is enough power to perform requested tasks at a given time. If enough power is not available, then the power budgeter 240 generates warning indications to the user and begins to "load shed" by powering down targeted components and staggering certain tasks to reduce the temporal demand from the battery resource.

For desktop computer systems that are not battery operated, the power budgeter 240 of the present invention also monitors the amount of energy demanded by current resource requests and guarantees that the power supply of the computer system is not overloaded at any given instant (e.g., by preventing sudden current draws from the supply that may cause power supply glitches). For instance, if three or more hard drives were required to be spun-up at the same time, the power budgeter 240 may stagger the spin cycles to reduce the maximum current draw from the power supply.

The PMC 100 also includes a thermal budgeter 250 of the present invention. The thermal budgeter 250 monitors the heat production of devices located within the computer system in specific locations within the system. By being informed of the energy consumption and by knowing the heat dissipation per area, the thermal budgeter 250 is able to guarantee that the overall temperature of the computer system does not exceed preprogrammed maximum limits. In cases where the energy consumption of particular devices, or thermal feedback from sensors in designated system regions, indicates that a thermal overload will occur, depending the power management policy currently in force, the thermal budgeter 250 takes steps to reduce the total energy consumption and thus reduce the temperature. For instance, idle peripherals may be placed into a low power consumption mode (e.g., the clock speed to the CPU may be reduced, the fan turned on, etc.) for a particular area. Generally, device drivers 270 communicate these current power states and requests (on an ongoing basis) future power needs and the thermal budgeter 250 allocates power to these devices. The duty cycle of the thermal budgeter 250 is due to the latency associated with temperature effects within the computer system.

Functionality can be increased within the PMC 100 of FIG. 4 of the present invention by adding independent drivers (e.g., 270, etc.) that correspond to add-in devices (such PCMCIA devices and peripherals) and their associated device drivers. Once registered, the device driver, or any registered unit, receives a unique identifier from the PMC 100. Many device drivers 270 may be coupled to the PMC core 110 at the same time. Once registered with the PMC 100, the drivers are coupled to communicate through the PMC 100 core 110 with the PMC and to any other registered client (device, extension, etc.). Any registered device may request a list of all other registered devices and their identifiers from the PMC 100. It is appreciated that each registered device driver has an associated set of timers available to it for setting dwell and decay times for the associated device. These timers can exist within the actual device itself or may be provided by the PMC 100 of the present invention. If provided by the PMC 100, they must be requested and initialized by the driver using any number of commands as illustrated in the API Function section.

The PMC 100 of the present invention utilizes the PMC core 110 to perform the following communication with registered device drivers. The PMC 100 can communicate with registered devices to obtain their power management capabilities (e.g., if they have programmable dwell time periods, decay time periods, power consumption characteristics, and latency time periods). The PMC 100 can communicate to these registered devices to obtain the current set values of the available power management capabilities. The PMC 100 can communicate to these registered devices to set, update and modify their current power management values as needed, see the API Function section.

It is appreciated that the PMC extensions (e.g., 260, 290) may also be registered with the PMC core 110 of the present invention and may include alternate versions of the power event sequencer 220, the power policy manager 230, the power budgeter 240 and the thermal budgeter 250 or other software components deemed useful to supplement device or system wide power management. Therefore, these extensions provide added flexibility within the present invention by offering preprogrammed and available modules for use by the PMC 100. However, only one version can be in control of the power management operations of the present invention at any given time.

Power Policy Manager. The power policy manager 230 of the present invention is discussed in more detail and provides the user with a central location to adjust the computer system's overall power control policy and also is an interface for independently altering a registered device's power management characteristics. The power policy manager 230 also provides global system monitoring and can originate a power management event. The power policy manager 230 is a system-wide power management event administrator within a given system. This module is used to enhance or replace the APM BIOS 300, or supply a subset (or superset) of the type of functionality provided by the APM BIOS 300 when present. For instance, the power policy manager 230 may be directed to be responsible to search for global system inactivity and when the system is idle, generate an appropriate system wide power management event. The system-wide suspend event is sent via the PMC's power event sequencer 220 to all software layers.

It is appreciated that the PMC 100 of the present invention does not need to provide default power policy manager functionality. If needed, this functionality may originate from either the APM BIOS 300 and/or a registered power policy manager device driver. Any registered power policy manager will work in cooperation with the APM BIOS 300, if it exists on a given system. It is possible to disable the APM BIOS 300 support or utilize it as a foundation for system-wide power management policy implementation.

Figure 5A:
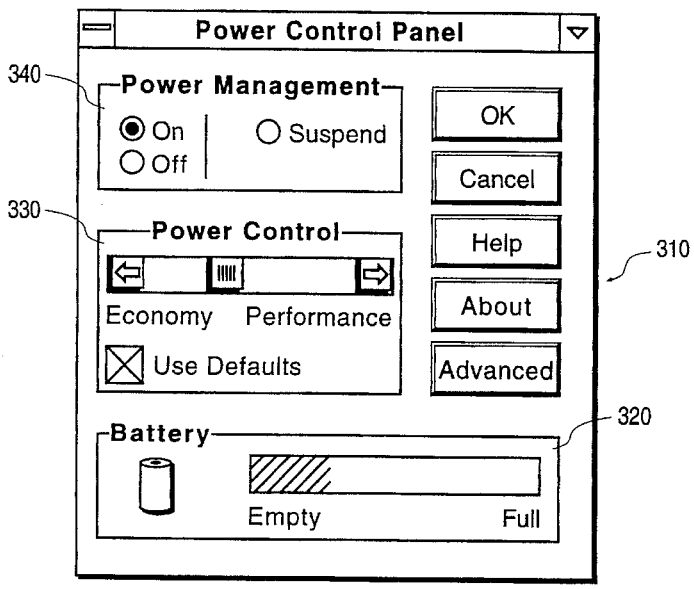
FIG. 5A illustrates a power control panel used in conjunction with the power policy manager of the present invention.
Figure 5B:
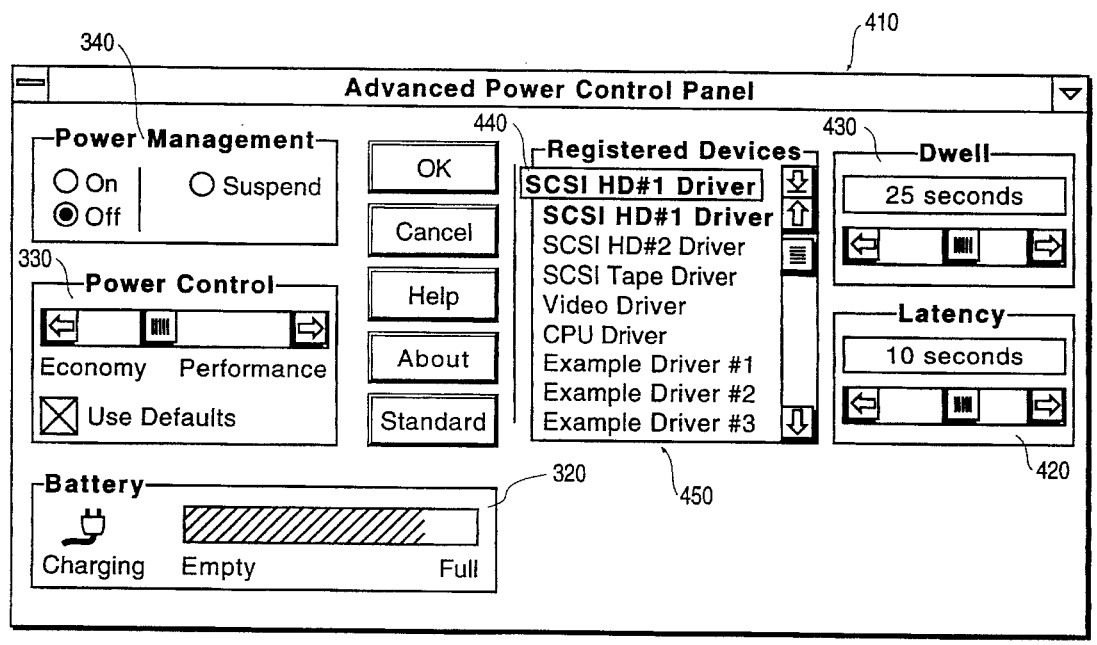
FIG. 5B illustrates an advanced power control panel used in conjunction with the power policy manager of the present invention.

FIG. 5(A) and FIG. 5(B) illustrate exemplary control screens used by an end user for altering or initializing the power policy manager 230. As shown in FIG. 5(A), an initial power control panel screen 310 is presented upon user request in the windows format. This screen contains a selection 340 for power management options and allows the user to manually place the computer system on, off or into a suspend state. Interface 330 illustrates a power control slide element having ranges from economy to performance. The slider (here shown positioned in the center of the region) determines which percentage of performance and economy the computer system will adopt. As the user slides the slider toward performance, the amount of power conservation performed by the add-in devices (and motherboard devices) of the present invention will decrease. As the slider is moved toward economy, the power conservation degrees of the computer system increases and the performance of the computer system decreases. Display interface 320 illustrates the battery level (if appropriate) of the computer system for battery powered systems.

For high performance settings of slider 330, the present invention power policy manager 230 communicates to the registered device drivers (using the uniform power management communication protocol, see API function section) and informs them of the high performance selection. Each device driver then determines the appropriate settings for its device and implements them. For instance, in high performance settings the dwell time for a given device will be extended and the latency time will be minimized so that the device remains in the fully powered state for as long as possible. Likewise, for economy settings, the dwell time is reduced and the latency time is increased. For each device the amount of settings or states in between fully on and suspend may vary so the registered driver (e.g., extension) for each device must determine the appropriate power management stage given a particular performance/economy setting of slider 330.

FIG. 5(B) illustrates an advanced power control panel screen 410 of the present invention power policy manager. This screen contains the power control slider 330, the battery level indicator 320, and the power management interface 340 of the control panel 310. In addition, this window driven control panel 410 also provides independent control of the registered devices via interface 450. Within interface 450, each of the registered drivers coupled to the PMC core 110 is listed. There is a separate driver for each registered unit which can include motherboard devices and other add-in peripherals, for instance PCMCIA peripherals. The user can select one particular device driver by highlighting it with a cursor control device and the selected driver is indicated via display 440. On the right are displayed the currently selected dwell times 430 and latency times 420 programmed for that driver. These values will reflect the currently selected power control policy of interface 330. However, the user may, via the sliders, independently alter these values to a particular setting for a selected driver.

The power policy manager 230, after receiving a change in the system performance/economy setting or after receiving a change pertinent to a particular registered device, will communicate to the PMC core 110 in order to forward commands to the appropriate registered device (see FIG. 4). If a change is made to the performance/economy setting, then the power policy manager 230 communicates to each and every registered device and forwards the currently selected state. The registered device drivers will then translate this selected state into a compatible power management characteristic recognized and allowed by the device. For instance, the dwell and decay times may be adjusted. If only a specific device's dwell and decay times are altered (e.g., via a user or software component), then the PMC core 110 need only inform the targeted device driver and will not communicate to all registered devices.

Power Budgeter. Power within a computer system should be considered as a resource that can be managed as any other system resource. The PMC 100 of the present invention therefore contains a power budgeter 240 module or extension. The power budgeter 240 contains special knowledge regarding the system's power supply requirement and when a device needs power (e.g., a disk drive spin-up) its registered driver requests power from the system's power budgeter 240. The power budgeter 240 can accept or reject the request based on the system's actual power supply as monitored by the power budgeter. If programmed, the power budgeter 240 may also load shed (e.g., reduce backlight in order to allow disk spin-up) in order to provided by the amount of requested power.

Figure 6:
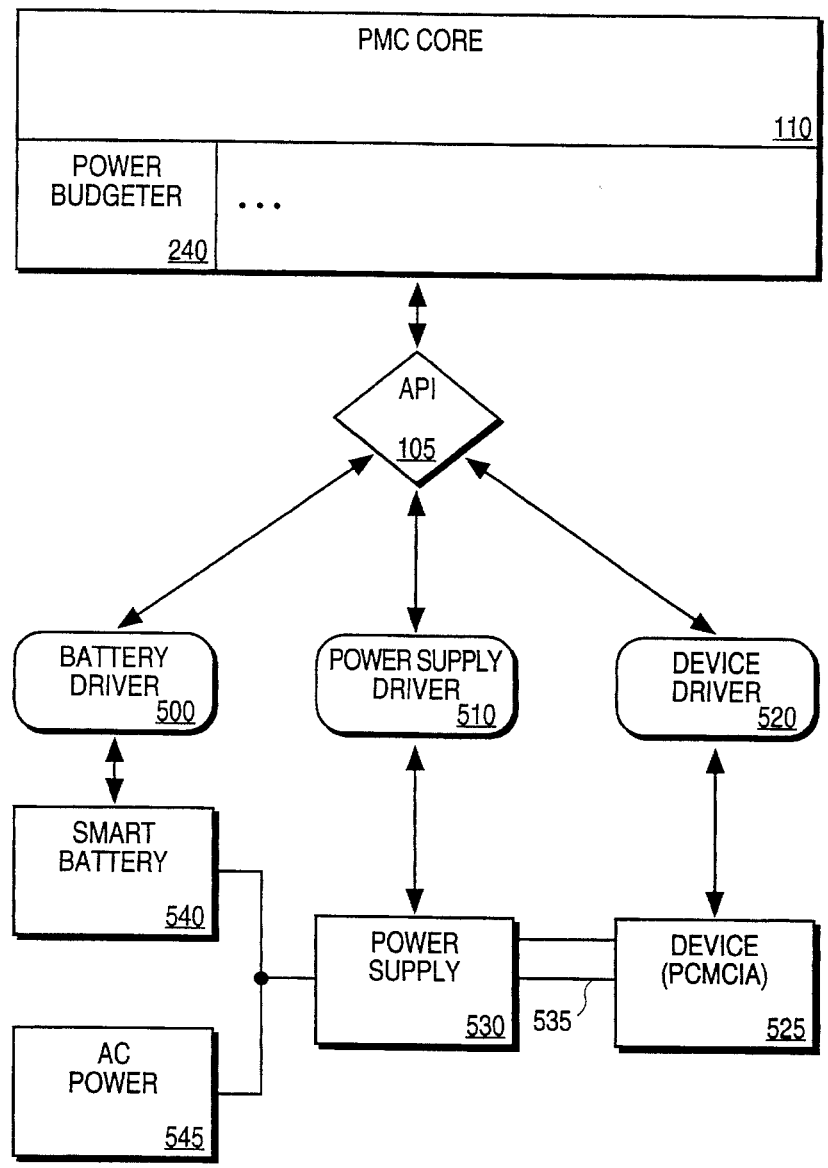
FIG. 6 illustrates a configuration used in conjunction with the power budgeter extension of the present invention.

FIG. 6 illustrates a typical configuration of the present invention involving the power budgeter 240 and a typical computer system having a smart battery power source 540 and an AC power source 545. The smart battery 540, commercially available from several sources, is able to relatively accurately report the energy reserve within the battery for system consumption. The smart battery 540 has an associated smart battery driver 500 that becomes registered with the PMC core 110 as a device driver; the PMC 100 can then communicate with the driver 500 to receive energy information. The device driver 500 is able to communicate with the smart battery 540 in order to retrieve energy information from the battery 540.

As shown in FIG. 6, both power sources (AC power 545 and smart battery 540) are coupled to a power supply 530 which similarly has an associated power supply driver 510 that is registered with the PMC core 110. This supply 530 provides the voltages necessary for a device 525 coupled to the power supply 530 via a power bus 535. The device 525 has an associated device driver 520 which is registered with the PMC 100 core 110. The power supply driver 510 and the device driver 520 may be the same driver. The drivers communicate with the PMC core 110 (and therefore the power budgeter 240) via the API 105. Communication between the power supply driver 510 and the device driver 520 is provided by the API 105 via the power budgeter module 240. Under this system, information can be communicated for power budgeting of AC power, battery power, and/or both.

Typical devices have two characteristics that are of interest from a power budgeting perspective. First, their startup power and startup duration requirements are important. Second is their power requirements under normal running conditions. Most personal computers have ±5 volt and ±12 volt supplies and provisions are made within the power budgeter for these voltages. Additionally, power supply manufacturers also support 3.3 volts which is accommodated by the power budgeter 240. A communication path between the driver and the power source is established my making calls to the power budgeter 240 through the PMC 100. The PMC's responsibility in these transactions is to validate and message for adequate memory, valid memory pointer, valid driver and device identifications, See API functions section.

Although the actual implementation of the power budgeter is user specific, and various procedures may be implemented to control the power distribution, the following Table 1.0 describes some of the basic commands and return codes provided by the power budgeter 240 of the present invention.

TABLE 1.0

PWR_BUDGETER_VERSION: provides the current version of the recognized power budgeter 240.
PWR_BUDGETER_REQUEST: request sent from a device to the power budgeter to make a power request for sufficient power to satisfy both the device's startup power and running power needs.
PWR_BUDGETER_RELEASE: used to release all power previously allocated by the power budgeter to the device.
PBERR_OK: forwarded to the device to allocate the requested power thereto.
PBERR_DEVICE_UNKNOWN: power request originated from unregistered or otherwise unknown device.
PBERR_DRIVER_UNKNOWN: power request originated from unregistered or otherwise unknown driver.
PBERR_MEMORY_INSUFFICIENT AND PBERR_POINTER INVALID: message error.

Power Event Sequencer. The power event sequencer 220 of the present invention routes information about global power events to the registered units of the PMC 100 including software within all layers (e.g., DOS, Windows™ applications, Windows device drivers, Windows™ system device drivers, Windows VxDs, etc.) using a particular notification sequence. Although programmable, a default sequence for power event notification is maintained by the present invention according to Table 2.0. The standard resume events are broadcast in the reverse order of Table 2.0. The PMC 100 of the present invention will broadcast global PM events, under the event sequence recorded in the sequencer 200, to all registered clients.

TABLE 2.0

1) Windows Applications
2) Windows System Drivers
3) Windows Installable Drivers
4) Windows VxDs
5) DOS TSRs, Applications, and device driver coupled to INT 2FH Whenever an application or a device driver receives an event notification under the present invention, it prepares accordingly for that event and returns either with PWRERR_OK or PWRERR_FAIL to indicate success or failure. Under the broadcast sequence shown in Table 2.0 the following conditions apply: (1) no component in the lower software layer needs service from the upper layers (e.g., VxD does not require services from a Window's application); (2) if a component needs service from a peer within the same software layer, service providers are loaded before the service takers; and (3) PM-aware DOS TSRs and DOS device drivers are hooked into the INT 2FH chain in the sequence wherein service providers are loaded before the service takers. Alternate sequencers can be used and stored as registered extensions 260.

Two-Phase Suspend Event Notification. The suspend event (originating from the power policy module 230, the APM BIOS 300, or from another application) is processed by the present invention power event sequencer 220 differently from other power events in order to relieve event rejection problems. In effect a two-phase suspend notification is implemented. The present invention broadcasts a global suspend event in two phases so that all software layers are able to gracefully accept or reject the event. In the case of event rejection by one or more registered elements, the present invention recovers from the rejected suspend request. In the first phase, the power event sequencer 220 broadcasts a message "is it OK to suspend?" by broadcasting PWR_SUSPEND_GET_READY message to each registered client. Therefore, clients have an opportunity to save information, as needed, in anticipation of the power managed state (e.g., suspend). In the second phase it broadcasts "PWR_SUSPEND_NOW" or "PWR_SUSPEND_REJECTED," depending on the outcome of the first phase broadcast to each registered client.

Under the present invention, the system is not placed into a suspend state until all other registered clients agree to suspend by responding positively to the PWR_SUSPEND_GET_READY message. If there are clients that rely on each other, they can at this time retrieve their required services before agreeing to the suspend.

During the first phase, after a device receives the message, PWR_SUSPEND_GET_READY, the device responds to requests from other devices that depend on it, allowing them to prepare for the suspend request. During the second phase, where the device receives the PWR_SUSPEND_NOW message, devices are assumed to be ready for suspend. Device-state information can be saved to memory because the memory state is normally preserved during the suspend. The state of memory will be preserved either because memory is not turned off, or its refresh rate is simply slowed during the suspend, or it is saved to a mass storage device prior to being powered down and then restored during the resume phase. The resume event is broadcast in the reverse order of the suspend event, allowing all software layers to be reactivated in a logical order.

Thermal Budgeter. As machines become smaller and faster, thermal considerations limit the speed of the machine. The present invention offers a thermal budgeter 250 (FIG. 4) that allows the coordination of thermal activities inside a machine. Special thermal considerations are processed by the thermal budgeter 250. Although the "average" temperature inside a machine would allow for safe operation of the CPU, by placing it near the battery which itself is a large heat source, the "local" temperature might well be above safe limits for the CPU. The net result is that component designers need to provide a "thermal" device driver for the system and device drivers for devices that are major thermal contributors and/or temperature-sensitive. These drivers are registered with and communicate cooperatively via the PMC's thermal budgeter module 250.

An exemplary thermal budgeter 250 communicates with registered thermal device driver to determine the location of heat producing elements of the system and also is informed, via the same driver, of the heat production of each element based on energy consumed and also of the heat dissipation properties of the system environment. The thermal budgeter 250 maintains a record of the heat production of registered devices; one such method is by recording power consumption (via a known power state) for each registered device or by using feedback from thermal sensors. Further, the thermal driver also supplies the maximum heat tolerable per system area. Using this information on a time basis, the thermal budgeter 250 determines the heat content of the different areas of the computer system based on the energy consumption of each element which can be collected by communication with each device or which is maintained by the power budgeter 240 of the present invention. By determining heat content based on energy consumed and heat dissipation, the thermal budgeter 250 determines if the maximum heat allowed is exceeded. If so, the thermal budgeter 250 recommends or commands that load shedding take place and nonessential or idle systems be suspended or the microprocessor clock speed be reduced, fans turned on, etc. Depending on the thermal budgeter 250 utilized, a warning is displayed to the user of a possible overheating problem. Alternate programming of the thermal budgeter 250 can be provided and recognized via additional registered extensions 260.

FUNCTIONALITY

Application Level. Overall, within the present invention, applications detect if the PMC 100 is not installed and this prevents PM-aware applications from calling PMC APIs 105 when there is no PMC 100 installed. Upon detection of the PMC 100, the application registers as a PMC client. Applications handle the PM event notification calls and this is an important function for an application to implement to be PM-aware. An application can process the notification and respond to the call properly so that the PMC 100 can handle the system-level power management effectively. Applications inform the PMC 100 about perceived system and/or device idle or busy states. For example, a screen saver notifies the PMC 100 when the keyboard and mouse are idle so that the PMC 100 can send the request to the appropriate device driver to shut down the video display or other related components. Applications can retrieve a device's power management capabilities, and get/set a device's parameters allowing applications to provide the user interface to control a devices' PM parameters, such as the device's dwell or decay timer.

Device Driver Level. Device drivers are important components of the whole power management scheme of the present invention. Working with the hardware, a device driver provides the following responsibilities. Drivers connect with the PMC 100 as an PM-aware device driver. This can require "listening" for a PMC enable event to be broadcast if the PMC 100 is not already installed or ready. After registering with the PMC 100, drivers inform the PMC 100, through PMC API 105 functions, of available power-saving modes built into the device or hardware. Drivers respond to commands from the PMC 100 to power down or power up a device or hardware. Drivers save and restore the device's condition when suspend and resume events occur and notify the PMC 100 about acceptance or rejection of a power management mode request and carry out the PMC's policy in self-managed mode (if supported). Drivers disconnect themselves from the PMC 100 when it or the PMC is terminated.

Virtual Device Driver Level. Virtual device drivers, VxD drivers 270, can connect with PMC 100 as an PM-aware device driver and this requires "listening" for a PMC ENABLE event to be broadcast. VxD drivers 270 can inform the PMC 100 about available power-saving modes built into the device or hardware through PMC API 105 functions, and respond to commands from the PMC 100 to power down or power up the device or hardware. VxD drivers 270 can save and restore the device's condition when suspend and resume events occur and notify the PMC 100 about acceptance or rejection of a power management mode request. VxD drivers 270 can carry out the PMC's policy in self-managed mode (if supported) and disconnect themselves from the PMC 100 when it or the PMC is terminated. VxD drivers also provide translation between the uniform power management communication protocol and the settings understood by the associated device.

APM BIOS 300 Level. Power management can be done without an APM BIOS using the PMC drivers of the present invention. However, in order to maximize the power management capability in a given system, APM v1.1 (or later) can be implemented in the system ROM BIOS.

Hardware Level. The present invention can operate with a number of different add-in components and no specific hardware add-in is a requirement of the present invention power management system. However, hardware devices implemented as described below contribute significantly to the present invention. Add-in devices of the present invention provide mechanisms (for example, read/write registers, shadow memory, internal long term storage, etc.) so that device drivers can save/restore hardware states. Devices make all registers and memory readable and writable or provide shadow memory for the unreadable components so that device drivers can save and restore the states of the hardware and provide power usage information (e.g., steady power state, start-up power, start-up time, etc.). Devices provide for programmable dwell time and decay time and offer power managed states between on and suspend.

OPERATIONAL FLOW

Figure 7:
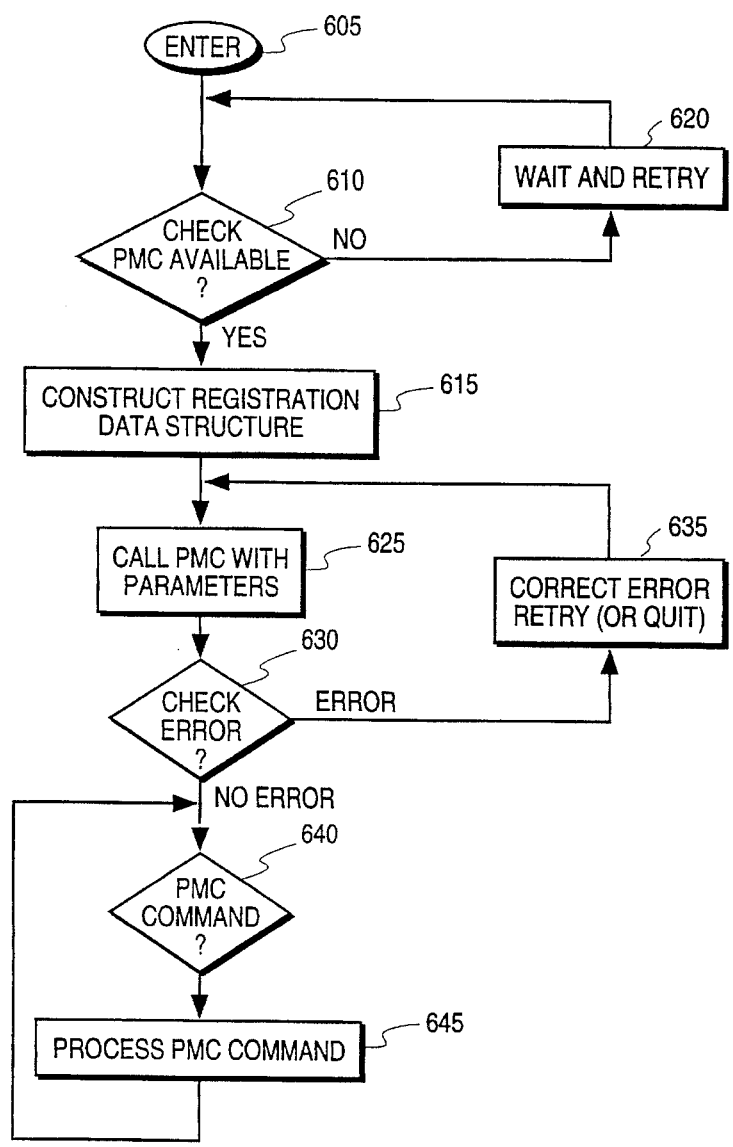
FIG. 7 is a flow diagram illustrating processing tasks of the present invention for registration with the PMC.

The following section describes the operational flow of some of the typical tasks capable of being performed within the present invention. The process flow of the present invention PMC 100 and associated drivers is typically implemented by one or more CPUs 10 of the computer system. FIG. 7 illustrates process 600 for registration of a PMC element or client to the PMC 100 of the present invention. The process enters at 605 and at 610 the elements checks via software layer to determine if the PMC 100 is available. For Windows VxDs 270 this determination is performed using a VxD service call. For Ring-3 Windows drivers and applications (as well as DOS clients) this is done by performing an appropriate software call via INT 2Fh or other API calls into the PMC core 110. A successful return from this call is an identifier into the PMC core 110 otherwise, an error is returned. If the PMC 100 is not available, then at 620 a timer can be set optionally for a retry period and at the expiration of the timer, block 610 is entered again. At some time without PMC 100 availability, block 620 will give up and exit process 600. If the PMC 100 is available, or becomes available, then at block 615 the PMC client (e.g., device driver, registered extension, manager, budgeter, sequencer, etc.) constructs a registration data structure (see for example within the API Functions sections) to pass to the PMC 100 at block 615. This data structure contains a call back identifier for the PMC's use for contacting the client. At block 625, the PMC 100 is called with the appropriate parameters. At block 630, the present invention checks if there are errors in the PMC registration call. If an error, then at block 635, the present invention attempts to correct the error and retries the PMC call. If no error, then the client waits at block 640 for a PMC command or notification. At this time, the PMC 100 assigns a registration identifier to the client the client is properly registered with the PMC 100, and the PMC has the proper call back identifier. Upon receiving a command (see API Function section), the client processes the command at 645 and returns to await another command at 640. Alternatively, on an error condition, the present invention may also not attempt to retry and instead give up.

Figure 8:
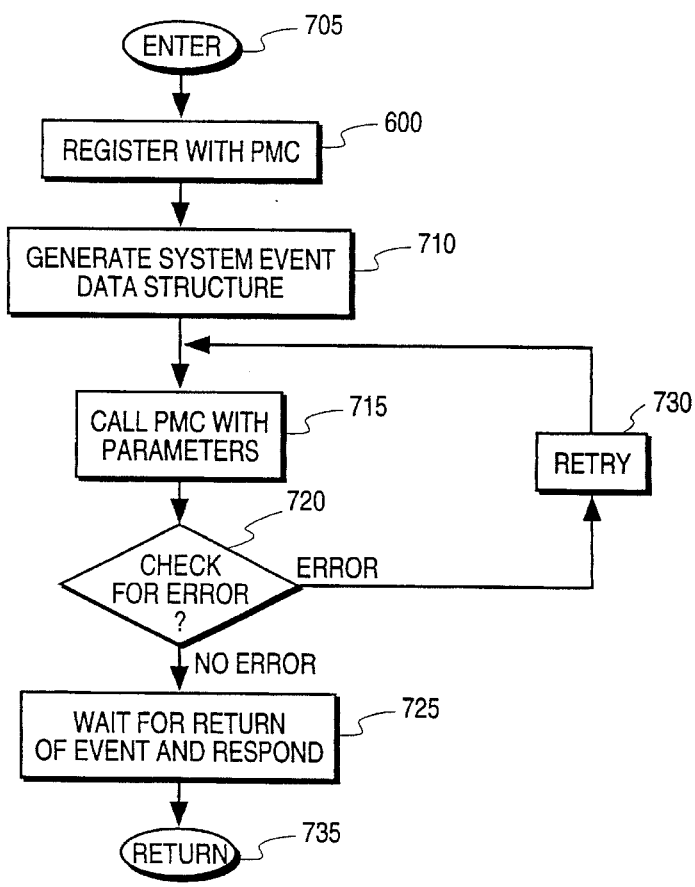
FIG. 8 is a flow diagram of processing used by the present invention for a PMC client generating a power event.

FIG. 8 illustrates a process 700 used for event generation within the present invention. Any registered PMC client (e.g., PMC extension driver, such as thermal budgeter, power policy monitor, etc., or from a device driver) can generate an event. The process starts to 705 and the steps required for registration, as found in block 600, are performed (if not already registered). At block 710, the PMC client generates the required data structure to satisfy the PWR_SYSTEM_POWER_EVENT command (see API Functions section). Table 3.0 illustrates the PM events that may be generated by a PMC client at block 710. At block 715, the PMC 100 is called with the appropriate parameters. At block 720, the client waits for response from the PMC 100 and will check for errors. If errors, then at block 730 they are corrected and the call to the PMC is tried again. If no error, then at block 725 the PMC client waits for a return broadcast of the power event from the PMC 100 and will respond accordingly to the event. The process exists at block 735.

TABLE 3.0

API PM Events Generated

| Name | Origin | Description |
|---|---|---|
| PWR_SUSPEND_REQUEST | BIOS, PMC-Policy-Mgr | Generated by APM BIOS 1.1 or PMC-Policy-Manager that wants the entire system to go into Suspend. This specific event is NOT broadcast to software via the PMC-Event-sequencer, but is translated by the PMC into the 2-Phase Suspend Sequence passed on to power-aware software (PWR_SUSPEND_GET_READY followed by either PWR_SUSPEND_NOW or PWR_SUSPEND_REJECTED). The originator of this event is responsible for generating the corresponding Resume event. |
| PWR_USER_SUSPEND_REQUEST | BIOS, PMC-DD, PMC-Policy-Mgr | The user has requested System Suspend by pressing a hardware button or key or by selecting a special software button or clicking on a special icon. This specific event is NOT broadcast to software via the PMC-Event-sequencer, but is translated by the PMC into the 2-Phase Suspend Sequence passed on to power-aware software (PWR_USER_SUSPEND_GET_READY followed by either PWR_SUSPEND_NOW or PWR_SUSPEND_REJECTED). The originator of this event is responsible for generating the corresponding Resume event. APM BIOS 1.0 does not generate this event when the user initiates Suspend by pressing a hardware button. |
| PWR_SUSPEND_RESUME | BIOS, PMC-Policy-Mgr | System is now resuming from a suspend state. Device states should be restored. |
| PWR_CRITICAL_SUSPEND | BIOS, | The system is going into a critical suspend state due to |

TABLE 3.0-continued

API PM Events Generated

| Name | Origin | Description |
| --- | --- | --- |
| | PMC-Policy-Mgr | loss of power or critical battery level. Devices do not perform time-consuming tasks in response. The originator of this event is responsible for generating the corresponding Resume event. |
| PWR_CRITICAL_RESUME | BIOS, PMC-Policy-Mgr | This occurs to allow software layers to recover as best they can after a Critical Suspend. |
| PWR_SYSTEM_STANDBY | BIOS, PMC-Policy-Mgr | Devices enter power management state. |
| PWR_USER_SYSTEM STANDBY | BIOS, PMC-DD | The user has requested System Standby by pressing a hardware button or key, or by selecting a special software button or icon. This tells all devices to go into Standby. APM BIOS 1.0 does not generate this event when the user requests Standby. |
| PWR_STANDBY_RESUME | BIOS, PMC-DD | Resume event from standby |
| PWR_BATTERY_LOW | BIOS, PMC-DD, PMC-Policy-Mgr | Battery low notification. |
| PWR_SYSTEM_POWER_ CHANGE | BIOS, PMC-DD, PMC-UPS-Mgr, PMC-Policy-Mgr | System power source changed: from battery/AC/UPS to UPS/AC/battery. Device can make a request to find out new source. |
| PWR_CLOCK_UPDATE | BIOS, PMC-Policy-Mgr | Notification to update the system clock as necessary. This can follow a Suspend or Shutdown event. |
| PWR_PWR_MANAGE_ENABLE | PMC-DD, PMC-Policy-Mgr | If not already doing active power management, all PM-aware devices can begin power management now. |
| PWR_PWR_MANAGE_ DISABLE | PMC-DD, PMC-Policy-Mgr | If currently doing power management, all PM-aware devices can stop doing power management and enter the Full On state. |
| PWR_SOFT_SHUTDOWN | PMC-DD, PMC-Policy-Mgr | Standard power ending, no power source available. This might be started by the user selecting a software "switch" (maybe a menu option or clicking on an icon) which tells the system that power is going away. |
| PWR_UPS_POWER_ON | PMC-UPS-Mgr | UPS emergency power being supplied now. |
| PWR_UPS_POWER_OFF | PMC-UPS-Mgr | UPS emergency power not required anymore - another power source has taken over. |
| PWR_UPS_SHUTDOWN | PMC-UPS-Mgr | UPS emergency power ending, no power source available. |
| PWR_POWER_RELEASE | PMC-Power-Budgetr | Power Budgeter has received a request for power from a device that cannot be filled. Power Budgeter initiates this event to request hardware devices to "deallocate" power back if at all possible. |
| PWR_OEM_EVENT | BIOS, PMC-DD, PMC-Policy-Mgr | These are power management events defined by OEM vendors. |

DD = Device Driver

Figure 9:
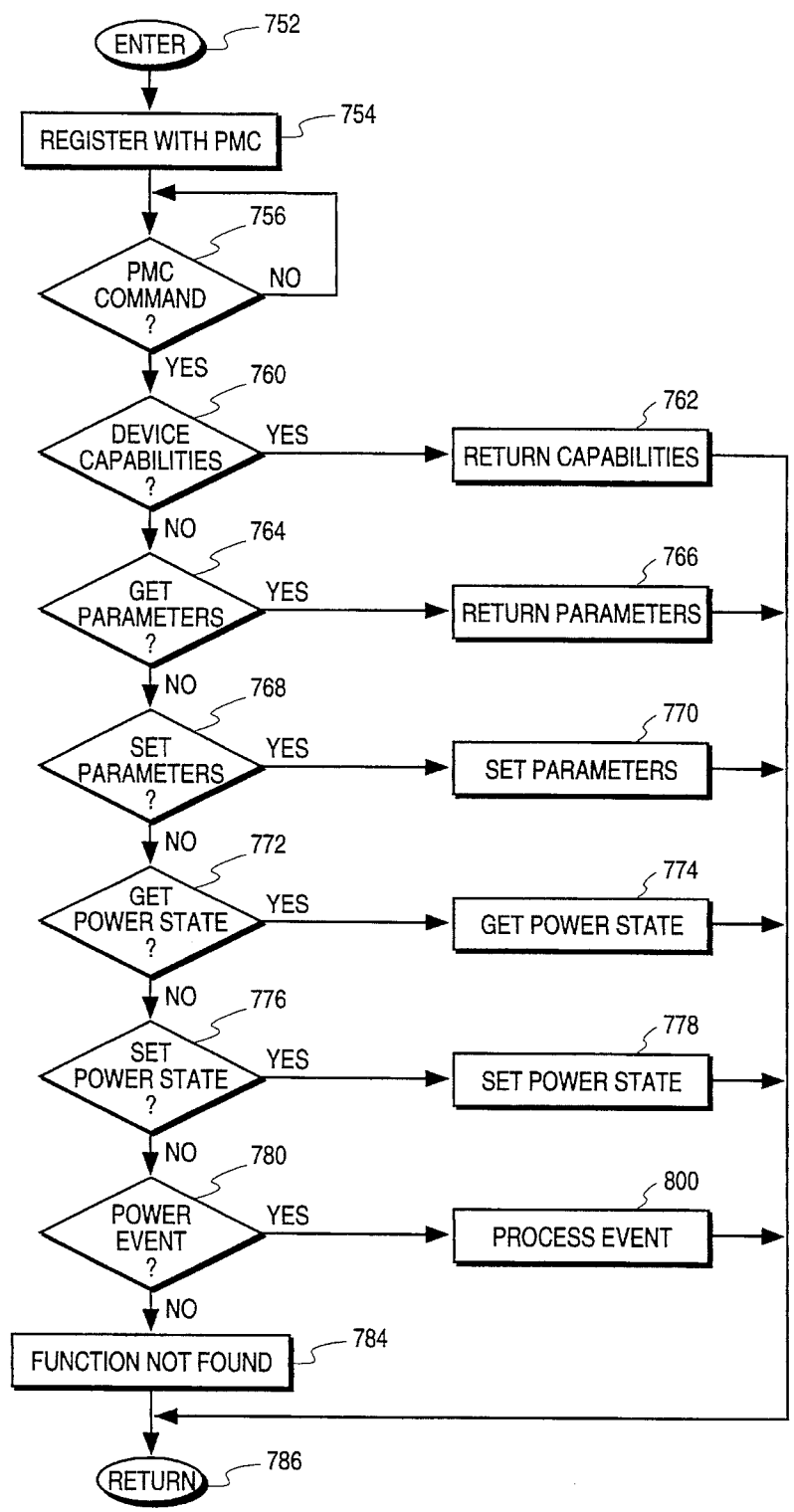
FIG. 9 is a flow diagram of a PMC client responding to a received PMC command of the present invention.

FIG. 9 illustrates a process 750 implementing a communication interface between a PMC client and the PMC 100 for the processing of typical commands from the PMC 100 of the present invention. Process starts at 752 and at block 754, if needed, the PMC client performs the registration steps as shown in block 600 to register. At block 756, the PMC client awaits a PMC command. Once received, at block 760 the command is checked to see if it is a PWR_GET_DEVICE_CAPABILITIES command. If so, the PMC client retrieves the device's capabilities and returns them in block 762 in the proper data structure (see API Function section) and returns PWRERR_OK to indicate no error. At block 764, the command is checked to see if it is a PWR_GET_DEVICE_PARAMETERS command. If so, the PMC client retrieves the device's currently set parameters (e.g., dwell time, decay time, latency, and power consumption etc.) and returns them in block 766 in the proper data structure (see API Functions section) and returns PWRERR_OK to indicate no error. At block 768, the command is checked to see if it is a PWR_SET_DEVICE_PARAMETERS command. If so, at block 770 the PMC client checks the device to determine if the device is busy and not able to accept changes. If not busy, at 770 the PMC client checks the new parameters of the command to determine if they are in range and, if so, modifies the device's currently set parameters (e.g., dwell time and decay time, etc.) based on the command data and returns PWRERR_OK to indicate no error.

At block 772 of FIG. 9, the command is checked to see if it is a PWR_GET_DEVICE_POWER_STATE command. If so, the PMC client retrieves the device's currently set power state and returns the data in block 774 in the proper data structure (see API Functions section) and returns PWRERR_OK to indicate no error. At block 776, the command is checked to see if it is a PWR_SET_DEVICE_POWER_STATE command. If so, at block 778 the PMC client checks the new power state is allowable, if so, modifies the device's current power state based on the command data and returns PWRERR_OK to indicate no error. At block 780, the present invention checks if the command is a PWR_SYSTEM_POWER_EVENT command and if so, at block 800 (see FIG. 10) the command is processed. If not, then at block 785 the PMC client returns that no recognized function/command was received and indicates that the function is not supported.

Figure 10:
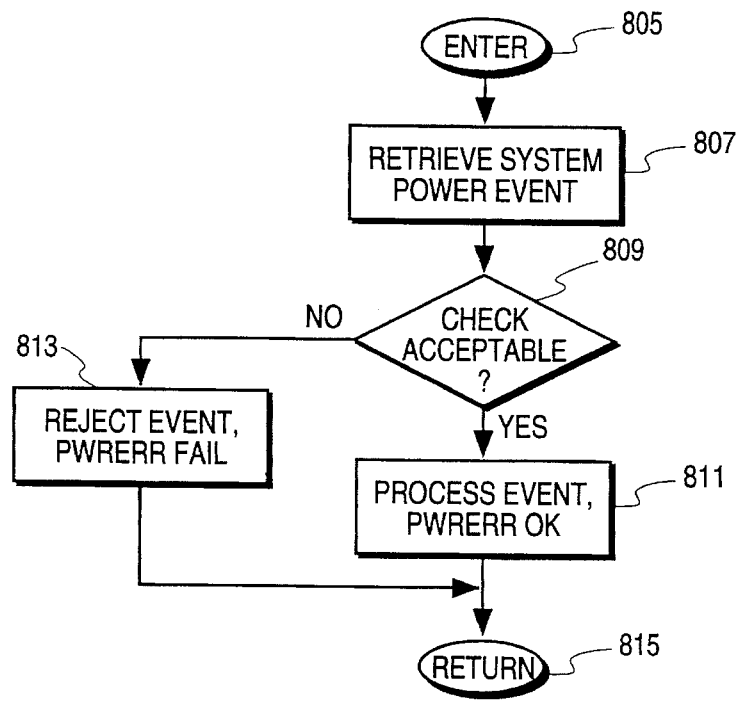
FIG. 10 is a flow diagram of a PMC client responding to a system power event from the PMC of the present invention.

FIG. 10 illustrates the process 800 performed by a PMC client in response to a system power event command from the PMC 100 of the present invention. The action performed by the PMC client to a system power event is dependent on the software or device receiving the event. For example, a registered network controller device driver may need to save the state of the network connection and disable the network card in response to a suspend event. Or, another PMC client such as a registered battery gauge user interface (software only) may not need to perform any acts in response to the suspend event. Process 800 is called in response to a PMC client receiving a system event and starts at 805 and at 807 the processes retrieves the system power event from the calling data structure. At block 809, the client determines if the event is acceptable. If not acceptable, then at block 813, the client returns an error code PWRERR_FAIL to indicate that the event or notification was not accepted by the device.

If the event was accepted, then at block 811 of FIG. 10 the PMC client processes the system event. The exemplary system events that can be received by the PMC client are summarized in Table 4.0. After processing the event, the PMC client returns a PWRERR_OK signal to indicate acceptance of the event. From 813 or 811 the process 800 exists at block 815.

TABLE 4.0

Power Management Events Received

| Name | Response Required | Description |
|---|---|---|
| PWR_SUSPEND_GET_READY | Yes | After sending this message to software registered with the PMC and getting back PWRERR_OK from all software at all levels, the PMC-Event-sequencer will then send PWR_SUSPEND_NOW or PWR_SUSPEND_REJECTED. |
| PWR_USER_SUSPEND_GET_READY | Yes | This event starts from user initiated action such as pressing a hardware button or selecting a software menu item or clicking on a special icon. After sending this message to software registered with the PMC and getting back PWRERR_OK from all software at all levels, the PMC-Event-sequencer will then send PWR_SUSPEND_NOW or PWR_SUSPEND_REJECTED. This event is similar to the PWR_SUSPEND_GET_READY except that it was started by user action rather than an inactivity timeout or some other mechanism. |
| PWR_SUSPEND_REJECTED | No | The initial request for Suspend (PWR_SUSPEND_GET_READY or PWR_USER_SUSPEND_GET_READY) has been rejected. Devices should return to their original power state that existed prior to the PWR_SUSPEND_GET_READY or PWR_USER SUSPEND_GET READY event. |
| PWR_SUSPEND_NOW | No | System will now go into suspend. Both Dwell and Decay device timers expire. After this has been broadcast and the APM BIOS exists, the APM BIOS is instructed to put the system into Suspend. If APM BIOS does not exist, all self-managed devices should now be in suspend. (This event is preceded by PWR_USER_SUSPEND_GET_READY or PWR_SUSPEND_GET_READY.) |
| PWR_SUSPEND_RESUME | No | System is now resuming from a suspend state. Device states should be restored to where they were before they entered suspend. Power management inactivity timers should be reset if returning to self-managed modes. |
| PWR_CRITICAL_SUSPEND | No | The system is going into a critical suspend |

TABLE 4.0-continued

Power Management Events Received

| Name | Response Required | Description |
|---|---|---|
| PWR_CRITICAL_RESUME | No | state due to loss of power or critical battery level. Devices do not perform time-consuming tasks. No response expected from DD. Because of the time-critical nature of this event, all software layers may or may not get informed before the system actually goes into suspend. This occurs to allow software layers to recover as best they can after a Critical_Suspend. (Due to the crucial time nature of the Critical-Suspend event, software may or may not be notified of that event.) Power management inactivity timers should be reset if returning to self-managed modes. |
| PWR_SYSTEM_STANDBY | Yes | Devices should enter power management state. |
| PWR_USER_SYSTEM_STANDBY | Yes | The user has requested System Standby by pressing a hardware button or key or selecting a software menu option or clicking on an icon. The same type action by devices for a normal Standby should occur. User prompting (when necessary) is appropriate. |
| PWR_STANDBY_RESUME | No | Resume event from standby |
| PWR_BATTERY_LOW | No | Battery-low notification. This event could possibly be followed by a Suspend or Critical Suspend event. Devices should reduce power possible. Software responsible for battery notification should also notify the user. |
| PWR_SYSTEM_POWER_CHANGE | No | System power source changed: from battery/AC/UPS to UPS/AC/battery. Device must make a request to find out new source. |
| PWR_CLOCK_UPDATE | No | Notification to update the system clock as necessary. This may follow a Resume event. |
| PWR_PWR_MANAGE_ENABLE | No | If not already doing active power management, all PM-aware devices should begin power management now. |
| PWR_PWR_MANAGE_DISABLE | No | If currently doing power management, all PM-aware devices should stop doing power management and enter the Full On state. |
| PWR_SOFT_SHUTDOWN | Yes | Standard power ending, no power source available. Data should be saved and if necessary, device state saved as well. User prompting as needed is appropriate. |
| PWR_UPS_POWER_ON | No | UPS supplying emergency power. |
| PWR_UPS_POWER_OFF | No | UPS emergency power not required anymore - system has standard power source. |
| PWR_UPS_SHUTDOWN | No | UPS emergency power ending, no power source available. |
| PWR_POWER_RELEASE | Yes | Power Budgeter has received a request from a device for power and cannot fill the request. Power Budgeter initiates this message to ask hardware to return "allocated" power if possible. |
| PWR_PMC_ENABLE | No | The PMC is being turned ON and will begin to coordinate PM events. This allows software to register that may have been installed before the PMC is installed. |
| PWR_PMC_DISABLE | No | The PMC is being turned OFF and will not coordinate PM events until further notice. Devices/Drivers need to register if PWR_PMC_ENABLE is broadcast later. |
| PWR_OEM_EVENT | No | These are power management events defined by OEM vendors. |

DD = device driver

The following two sections, PMC Calling Interface and API Function, illustrate exemplary implementations of functions of the present invention PMC 100. These sections also illustrate exemplary aspects of the present inventions uniform power management communication protocol.

PMC CALLING INTERFACE SECTION

The calling interface is served via a single entry, PMSendCommand(). Calls into the PMC can be made using the following exemplary API template.

```
INT FAR PASCAL PMSendCommand(dwCmd, lpMem)
    DWORD      dwCmd;      // command type
    LPVOID     lpMem;      // memory buffer pointer
```

There are two required arguments: dwCmd is the requested command and lpMem is the far pointer to a block of global memory.

The dwCmd parameter indicates the PMC extension class and the function to be performed within that class. The upper word of dwCmd specifies the PMC extension class. This tells the PMC which service class this command type is being sent to. For example, some function calls are handled directly by the PMC itself while others are sent to specific PMC extension drivers that may be registered. Values for the PMC extension class are defined as follows:

```
#define DRVTYPE_PMC                 0    // PMC driver
#define DRVTYPE_APMBIOSINTERFACE    1    // APM BIOS Interface driver
#define DRVTYPE_PWRBUDGETER         2    // Standard power budgeting
#define DRVTYPE_PWRPOLICYMANAGER    3    // System-wide power management
#define DRVTYPE_THERMALMANAGER      4    // Thermal management
#define DRVTYPE_UPSMANAGER          5    // UPS power manager
#define DRVTYPE_EVENTHANDLER        6    // PM event sequencing
```

Additional PMC extension driver types can be defined and registered with the PMC. The lower word of the dwCmd indicates the command type. Below are the command functions available directly from the PMC.

The PMC verifies that the lpMem memory pointer is good by checking the pointer for a non-zero value. Memory buffers passed from an application to the PMC are created, owned and managed by the caller. This means that the caller creates (using the Windows GlobalAlloc() API call, for example) and defines the memory buffer. The PMC does not deallocate the memory buffer passed to it. For function calls where information is returned to the application, the PMC assumes that the memory buffer is initialized and unused space is set to all zero.

Once control has been returned from the PMC to the caller, the caller can do whatever is necessary with the memory buffer for the call. All information passed to the PMC has been copied to another location, and neither the PMC nor the target device depends on the continued existence of the memory buffer from the caller.

Many of these API functions return a variable amount of information depending on the number and types of PM devices registered. It is recommended that the memory buffer used to gather information from the PMC be allocated enough memory to handle a large amount of data. A 4K buffer is a reasonable size. If the size is not large enough, the PMC returns an error indicating the size of the memory buffer should be increased. The first two fields of the memory buffer indicate the size of the buffer input to the PMC and the size required on output from the PMC.

Regardless of whether the PMC handles the API function call or whether it passes the function on to an extension driver, the first two fields of the memory buffer are defined to always be:

```
WORD wMemBufSize;         // Memory buffer size in bytes      (input)
WORD wmemBufReturnSize;   // Bytes returned in memory buffer  (output)
```

The wMemBufSize is a 16-bit input value used to indicate the size in bytes of the memory buffer passed to the PMC. This buffer-size field is used by the PMC or extension driver to determine if enough space is available to return the requested information and to verify that enough information has been passed to the PMC and/or extension driver. wMemButReturnSize is used by the PMC or extension driver to return to the caller the number of bytes actually passed back in the memory buffer. For example, if an application passed a 4K buffer to the PMC for a function call that required only 32 bytes, the PMC would put 32 into the wMemBufReturnSize field. If the wMemBufSize field contained a 16 to indicate the buffer length and the function requires 32 bytes to return the requested information, the PMC would return an error from the function call, and then put 32 into wMemBufReturnSize as the size needed before the request can be granted.

Each field of the memory buffer associated with each API function is described in the following sections as being either an input field, labeled "(input)" or as output, labeled "(output)".

The valid PMC commands are enumerated below along with their applicable memory structure and allowable return code(s).

API FUNCTION SECTION

The following section illustrates exemplary API commands that can be generated within the present invention that the PMC 100 understands. It is appreciated that although presented in a particular programming language and descriptive of a particular computer system, the present invention should not be construed as, and is not intended to be, limited to such embodiment.

PWR_GET_REVISION_INFO Function

```
INT FAR PASCAL PMSendCommand(dwCmd, lpMem)
    DWORD     dwCmd;      // command type = PWR_GET_REVISION_INFO
    LPVOID    lpMem;      // memory buffer pointer
```

PMC revision information is returned in the global memory structure as a result of this call. The revision numbers (BCD) are each packed into a word as Major Revision Number *0x0100+Minor Revision Number.

The dwCmd parameter should be set to PWR_GET_REVISION_INFO for this function.

The lpMem parameter is a 32-bit pointer to a block of memory used to return information to the caller. The structure of that information is described in the PMREVISION structure outlined below. This memory buffer must be at least four bytes long to indicate the size of the buffer and to receive the size required for this function call. The caller may allocate a buffer four bytes long, initialize it to all zeros, call this API function, and use the return value to determine exactly how much memory is needed for the lpMem buffer by checking the wMemBufReturnSize field returned by the PMC. For example:

The lpMem parameter is a 32-bit pointer to a block of memory used to return information to the caller. The structure of that information is described in the DRIVERREGISTRY structure outlined below. This memory buffer must be at least four bytes long to indicate the size of the buffer and to receive the size required for this function call. The caller may allocate a buffer four bytes long, set the wMemBufSize field to four, call this API function, and use the return value to determine exactly how much memory is needed for the lpMem buffer by checking the wMemBufReturnSize field returned by the PMC.

```
#define MAX_NAME_LENGTH 40
typedef struct {
    WORD    wMemBufSize;                           // Memory buffer size                              (input)
    WORD    wMemBufReturnSize;                     // Bytes returned in memory buffer                 (output)
    WORD    wAPMBIOS_Revision;                     // Revision number of APM BIOS specification       (output)
    WORD    wAPMAPI_Revision;                      // Revision number of PMC API specification implemented (output:
    WORD    wPMC_Revision;                         // Revision number of PMC driver                   (output)
    char    cPMC_VendorName[MAX_NAME_LENGTH];      // name of PMC vendor                              (output)
}PMREVISION;
PMC Return(s):    PWRERR_OK
                  PWRERR_MEMORY_INSUFFICIENT
                  PWRERR_MEMORY_POINTER_INVALID
```

PWR_REGISTER_DRIVER Function

```
INT FAR PASCAL PMSendCommand(dwCmd, lpMem)
    DWORD     dwCmd;      // command type = PWR_REGISTER_DRIVER
    LPVOID    lpMem;      // memory buffer pointer
```

All PM-aware target device drivers must register with the PMC through this call. This allows interprocess communication through all layers of Windows and DOS software.

The dwCmd for this call is defined as PWR_REGISTER_DRIVER.

```
#define DRV_NAME_LEN 128
typedef struct {
    WORD    wMemBufSize;                        // Memory buffer size      (input)
    WORD    wMemBufReturnSize;                  // Bytes returned in buffer (output)
    DWORD   dwDriverID;                         // Device Driver ID        (output)
    char    cDriverName[DRV_NAME_LEN];          // Driver Name             (input)
    WORD    wRevision;                          // Driver revision         (input)
}DRIVERREGISTRY;
PMC Return(s):    PWRERR_OK
                  PWRERR_MEMORY_INSUFFICIENT
                  PWRERR_MEMORY_POINTER_INVALID
```

PWR_DEREGISTER_DRIVER Function

```
INT FAR PASCAL PMSendCommand(dwCmd, lpMem)
    DWORD   dwCmd;    // command type = PWR_DEREGISTER_DRIVER
    LPVOID  lpMem     // memory buffer pointer
```

With this call a target device driver de-registers itself and all its devices from the PMC. The dwCmd parameter for this call is PWR_DEREGISTER_DRIVER. The lpMem parameter is a far pointer to a memory structure with the same information that was used for the PWR_REGISTER_DRIVER function call. The structure of that information is described in the DRIVERDEREGISTER structure outlined below. For example:

layers of Windows software. The dwCmd parameter for this call is defined as PWR_REGISTER_DEVICE. The lpMem parameter is a 32-bit pointer to a block of memory used to return information to the caller. The structure of that information is described in the DEVICEREGISTRY structure outlined below. For example:

```
typedef struct {
    WORD    wMemBufSize;           // Memory buffer size       (input)
    WORD    wMemBufReturnSize;     // Bytes returned in buffer (output)
    DWORD   dwDriverID;            // Device Driver ID         (input)
}DRIVERDEREGISTER;
PMC Return(s):    PWRERR_OK
                  PWRERR_MEMORY_INSUFFICIENT
                  PWRERR_MEMORY_POINTER_INVALID
                  PWRERR_DRIVER_UNKNOWN
```

PWR_REGISTER_DEVICE Function

```
INT FAR PASCAL PMSendCommand(dwCmd, lpMem)
    DWORD   dwCmd;    // message type = PWR_REGISTER_DEVICE
    LPVOID  lpMem;    // memory buffer pointer
```

All PM-aware target device drivers must register themselves and devices they control with the PMC through this call. This enables interprocess communication through all

```
#define MAX_NAME_LEN 40
typedef struct {
    WORD     wMemBufSize;                       // Memory buffer size       (input)
    WORD     wMemBufReturnSize;                 // Bytes returned in buffer (output)
    DWORD    dwDriverID;                        // Device driver ID         (input)
    DWORD    dwDeviceID;                        // Device ID                (input)
    DWORD    dwDeviceType;                      // Device type              (input)
    char     cDeviceString[MAX_NAME_LEN];       // Device string            (input)
    char     cDeviceName(MAX_NAME_LEN];         // Device name              (input)
    WORD     wSoftwareType;                     // Software type            (input)
    FARPROC  fpPMHandler;                       // Device PM procedure      (input)
    WORD     wPM32_Sel;                         // 32-bit Windows selector  (input)
}DEVICEREGISTRY;
```

The wSoftwareType field indicates the software type of this driver. This information is used by the Event Handler to determine the order that software gets notified of impending power management events. The following values apply:

```
#define    SW_WINAPP      0x0042    // Windows 16-bit applications (*.EXE or *.DLL)
#define    SW_WINDRV      0x0012    // Windows device drivers (*.DRV)
#define    SW_WINVXD      0x0001    // Windows Virtual device driver (*.386)
#define    SW_WINSYS      0x0022    // Windows System Driver ie. COMM.DRV, MOUSE.DRV,
etc.
#define    SW_DOS         0x0004    // DOS application, TSR, or device driver
#define    SW_WIN32APP    0x0081    // Windows 32-bit application
PMC Return(s):   PWRERR_OK
                 PWRERR_DRIVER_UNKNOWN
                 PWRERR_MEMORY_INSUFFICIENT
                 PWRERR_MEMORY_POINTER_INVALID
                 PWRERR_DEVICE_ID_DUPLICATE
                 PWRERR_DEVICE_ID_INVALID
                 PWRERR_CALLBACK_INVALID
```

PWR_DEREGISTER_DEVICE Function

```
INT FAR PASCAL PMSendCommand(dwCmd, lpMem)
   DWORD     dwCmd;      // command type = PWR_DEREGISTER_DEVICE
   LPVOID    lpMem;      // memory buffer pointer
```

This call allows a target device driver to de-register specific devices from the PMC. Single devices can be de-registered by calling this function. For example, if a device driver controls multiple devices, and one of those devices "goes away," this function can be used to de-register that single device. The dwCmd parameter for this call is PWR_DEREGISTER_DEVICE. The lpMem parameter is a 32-bit pointer to a memory buffer that contains the information defined in the structure of DEVICEDEREGISTER. The buffer layout is defined as follows:

```
#define MAX_NAME_LEN 40
typedef struct {
   WORD      wMemBufSize;         // memory buffer size       (input)
   WORD      wMemBufReturnSize;   // Bytes returned in buffer (output)
   DWORD     dwDriverID;          // Device driver ID         (input)
   DWORD     dwDeviceID;          // Device ID                (input)
}DEVICEDEREGISTER;
PMC Return(s):   PWRERR_OK
                 PWRERR_MEMORY_INSUFFICIENT
                 PWRERR_MEMORY_POINTER_VALID
                 PWRERR_DRIVER_UNKNOWN
                 PWRERR_DEVICE_UNKNOWN
```

PWR_REGISTER_EXTENSION Function

```
INT FAR PASCAL PMSendCommand(dwCmd, lpMem)
   DWORD     dwCmd;      // command type = PWR_REGISTER_EXTENSION
   LPVOID    lpMem;      // memory buffer pointer
```

Certain PMC functions or services can be extended or replaced by registered device drivers designed to take over and/or add power management control. Those PMC extension classes are discussed in section 2.2, "PMC Model," of this document. Other extension services beyond those pre-defined classes listed below can also be registered with the PMC. Only one of each class of PMC extension driver can be registered at a time. For example, a future system could define a secondary power source within the computer chassis that requires power management within the realm of the PMC. This new service device driver for that power source might register itself with the PMC using a driver type of 0x9000. As long as there is not a device driver extension already registered with that driver type, the PMC accepts the registration. All function calls passed to the PMC with that driver type identifier in the command parameter are blindly passed to that registered device driver extension.

The dwCmd for this call is defined as PWR_REGISTER_EXTENSION.

The lpMem parameter is a 32-bit pointer to a block of memory used to return information to the caller. The structure of that information is described in the EXTENSIONREGISTRY structure outlined below. This memory buffer must be at least four bytes long to indicate the size of the buffer and to receive the size required for this function call. The caller may allocate a buffer four bytes long, set the wMemBufSize field to four, call this API function, and use the return value to determine just exactly how much memory is needed for the lpMem buffer by checking the wMemBufReturnSize field returned by the PMC. For example:

```
#define DRV_NAME_LEN 128
typedef struct {
    WORD        wMemBufSize;                    // Memory buffer size          (input)
    WORD        wMemBufReturnSize;              // Bytes returned in buffer    (output)
    DWORD       dwDriverID;                     // Device driver ID            (output)
    WORD        wExtensionType;                 // Extension driver type       (input)
    char        cDriverName[DRV_NAME_LEN];      // Driver name                 (input)
    WORD        wRevision;                      // Driver revision             (input)
    WORD        wSoftwareType;                  // software type               (input)
    FARPROC     fpPMHandler;                    // Device PM procedure         (input)
    WORD        wPM32_Sel;                      // 32-bit Windows selector     (input)
}EXTENSIONREGISTRY;
```

The wExtensionType field defines the type of power-aware target device driver that is registering with the PMC. This field identifies drivers used to replace or extend standard functionality of the PMC such as power event sequencing, power budgeting, system-wide power policy management, or thermal management. Only one of each driver type can be registered at a time. For example, only one replacement Power Event Handler can register with the PMC. Additional PMC extensions that attempt to register when a replacement is already installed receive an error return from the PMC. The following values are used for pre-defined Extension Driver types:

```
#define DRVTYPE_APMBIOSINTERFACE    1   // APM BIOS Interface manager
#define DRVTYPE_PWRBUDGETER         2   // Standard power budgeting
#define DRVTYPE_PWRPOLICYMANAGER    3   // System-wide power policy management
#define DRVTYPE_THERMALMANAGER      4   // Thermal management
#define DRVTYPE_UPSMANAGER          5   // UPS power manager
#define DRVTYPE_EVENTHANDLER        6   // PM event sequencing
```

The wSoftwareType field indicates software type of this extension driver. This information is used by the Event Handler to determine the order that software gets notified of impending power management events. The following values apply:

```
#define     SW_WINAPP       0x0042  // Windows 16-bit applications (*.EXE or *.DLL)
#define     SW_WINDRV       0x0012  // Windows device drivers (*.DRV)
#define     SW_WINVXD       0x0001  // Windows virtual device driver (*.386)
#define     SW_WINSYS       0x0022  // Windows System Driver ie. COMM.DRV, MOUSE.DRV
#define     SW_DOS          0x0004  // DOS application, TSR, or device driver
#define     SW_WIN32APP     0x0081  // Windows 32-bit application
PMC Return(s):  PWRERR_OK
                PWRERR_MEMORY_INSUFFICIENT
                PWRERR_MEMORY_POINTER_INVALID
                PWRERR_EXTENSION_DUPLICATE
                PWRERR_CALLBACK_INVALID
```

PWR_DEREGISTER_EXTENSION Function

```
INT FAR PASCAL PMSendCommand(dwCmd, lpMem)
    DWORD       dwCmd;      // command type = PWR_DEREGISTER_EXTENSION
    LPVOID      lpMem;      // memory buffer pointer
```

This call allows a PMC extension driver to de-register itself from the PMC. The dwCmd parameter for this call is PWR_DEREGISTER_EXTENSION. The lpMem parameter is a 32-bit far pointer to a memory structure with the same information that was used for the PWR_REGISTER_EXTENSION function call. The structure of that information is described in the DRIVERDEREGISTER structure outlined below.

```
typedef struct {
    WORD     wMemBufSize;         // Memory buffer size        (input)
    WORD     wMemBufReturnSize;   // Bytes returned in buffer  (output)
    DWORD    dwDriverID;          // Device Driver ID          (input)
}DRIVERDEREGISTER;
PMC Return(s):   PWRERR_OK
                 PWRERR_MEMORY_INSUFFICIENT
                 PWRERR_MEMORY_POINTER_INVALID
                 PWRERR_DRIVER_UNKNOWN
```

PWR_GET_DEVICE_CAPABILITIES Function

```
INT FAR PASCAL PMSendCommand(dwCmd, lpMem)
    DWORD    dwCmd;     // command type = PWR_GET_DEVICE_CAPABILITIES
    LPVOID   lpMem;     // memory buffer pointer
```

This function returns a list of the specified device's power capabilities. The information is returned in the DEVCAPABILITIES memory structure listed below. The PMC retrieves this information by passing a request to the target device driver and then returning that information to the caller. The dwCmd parameter should be set to PWR_GET_DEVICE_CAPABILITIES for this function.

The lpMem parameter is a 32-bit pointer to a block of memory used to return information to the caller. The structure of that information is described in the DEVCAPABILITIES structure outlined below. This memory buffer must be at least four bytes long to indicate the size of the buffer and to receive the size required for this function call. The caller may allocate a buffer four bytes long, set the wMemBufSize field to four, call this API function, and use the return value to determine just exactly how much memory is needed for the lpMem buffer by checking the wMemBufReturnSize field returned by the PMC.

0x80000000. Note that this is a signed number: power consumers will report positive values, power producers will report negative values. lPowerConsume_SUSPEND represents the amount of power consumed (in milliwatts) while the device is in Suspend mode. If the power consumption is unknown, this field returns 0x80000000. Note that this is a signed number: power consumers will report positive values, power producers will report negative values. dwDwellTime_Min and dwDwellTime_Max define the allowable minimum and maximum range of time while the device is fully powered before it begins to decay into power conservation states. These numbers are used by configuration software to define the allowable minimum and maximum timer range a user can set for this device. These unsigned values are measured in milliseconds and can range from 0x00000000 to 0xFFFFFFFE (0 to 71582 minutes=zero to 1193 hours). A value of 0xFFFFFFFF means that the time is undefined.

```
#define MAX_NAME_LEN 40             // string length
typedef struct {
    WORD     wMemBufSize;           // Memory buffer size            (input)
    WORD     wMemBufReturnSize;     // Bytes returned in buffer      (output)
    DWORD    dwDriverID;            // Device driver ID              (input)
    DWORD    dwDeviceID;            // Device ID                     (input)
    LONG     lPowerConsume_FULLON;  // Full on: power consumed       (output)
    LONG     lPowerConsume_STANDBY; // Standby: power consumed       (output)
    LONG     lPowerConsume_SUSPEND; // Suspend: power consumed       (output)
    DWORD    dwDwellTime_Min;       // Dwell timer range (minimum)   (output)
    DWORD    dwDwellTime_Max;       // Dwell timer range (maximum)   (output)
    DWORD    dwDwellTime_Default;   // Dwell timer (default)         (output)
    DWORD    dwDecayTime_Min;       // Decay timer range (minimum)   (output)
    DWORD    dwDecayTime_Max;       // Decay timer range (maximum)   (output)
    DWORD    dwDecayTime_Default;   // Decay timer (default)         (output
    DWORD    dwLatency_Max;         // Latency time (maximum)        (output)
}DEVCAPABILITIES;
```

The dwDriverID and dwDeviceID indicate which target device capabilities to get. lPowerConsume_FULLON represents the typical maximum amount of power consumed (in milliwatts) while the device is at maximum power consumption, maximum performance and minimum latency. If the power consumption is unknown, this field returns 0x80000000. Note that this is a signed number: power consumers will report positive values, power producers will report negative values. lPowerConsume_STANDBY represents the absolute minimum amount of power consumed (in milliwatts) while the device is in Standby mode. If the power consumption is unknown, this field returns dwDwellTime_Default represents the default timer value for this device to Dwell or remain in full on state. For example, when the device first powers up, this is the value programmed into the Dwell timer. This value can be thought of as the "factory setting"; that is, the value the device is programmed to use when it first came out of the factory. This unsigned value is measured in milliseconds and can range from 0x00000000 to 0xFFFFFFFE (0 to 71582 minutes= zero to 1193 hours). A value of 0xFFFFFFFF means that the time is undefined. dwDecayTime_Min and dwDecayTime_Max represents the allowable minimum and maximum amount of time (in milliseconds) that a device takes as it begins to use power conservation measures until it reaches its "deepest" power conservation state. The power conservation state at the end of Decay time is defined ultimately relative to the power policy for the device with respect to targets for power consumption and device latency. The deepest power conservation state at the end of Decay time using power consumption as the policy priority is where the device consumes the least amount of power, its latency is the greatest, and its performance is the minimum. These numbers are used by configuration software to define the allowable minimum and maximum range a user can set for this device. These unsigned values can range from 0x00000000 to 0xFFFFFFFE (0 to 71582 minutes=zero to 1193 hours). A value of 0xFFFFFFFF means that the Decay time is undefined.

dwDecayTime_Default represents the default timer value (in milliseconds) for the Decay transition. For example, when the device first powers up, this is the default value programmed into the device's Decay timer. This value can be thought of as the "factory setting"; that is, the value the device is programmed to use when it first came out of the factory. This unsigned value can range from 0x00000000 to 0xFFFFFFFE (0 to 71582 minutes=zero to 1193 hours). A value of 0xFFFFFFFF means that the default Decay time is undefined. dwLatency_Max is the maximum latency time this device will have. Zero is assumed to be the minimum as well as the default. This unsigned value is measured in milliseconds and can range from 0x00000000 to 0xFFFFFFFE (0 to 71582 minutes=0 to 1193 hours). A value of 0xFFFFFFFF means that the maximum latency time is undefined.

| PMC Return(s): | PWRERR_OK |
| --- | --- |
| | PWRERR_MEMORY_INSUFFICIENT |
| | PWRERR_MEMORY_POINTER_INVALID |
| | PWRERR_DEVICE_UNKNOWN |
| | PWRERR_DRIVER_UNKNOWN |
| | PWRERR_DEVICE_TIMEOUT |
| | PWRERR_DEVICE_UNABLE |
| | PWRERR_DEVICE_INCAPABLE |

PWR_GET_DEVICE_PARAMETERS Function

```
INT FAR PASCAL PMSendCommand(dwCmd, lpMem)
   DWORD    dwCmd;    // command type = PWR_GET_DEVICE_PARAMETERS
   LPVOID   lpMem;    // memory buffer pointer
```

This function is used to get the current parameters for the specified device. The PMC retrieves this information by passing a request to the target device driver. The dwCmd parameter should be set to PWR_GET_DEVICE_PARAMETERS for this function.

The lpMem parameter is a 32-bit pointer to a block of memory used to return information to the caller. The structure of that information is described in the DEVPARAMETERS structure outlined below. This memory buffer must be at least four bytes long to indicate the size of the buffer and to receive the size required for this function call. The caller may allocate a buffer four bytes long, set the wMemBufSize field to four, call this API function, and use the return value to determine just exactly how much memory is needed for the lpMem buffer by checking the wMemBufReturnSize field returned by the PMC.

```
typedef struct {
   WORD     wMemBufSize;            // Memory buffer size       (input)
   WORD     wMemBufReturnSize;      // Bytes returned in buffer (output)
   DWORD    dwDriverID;             // Device driver ID         (input)
   DWORD    dwDeviceID;             // Device ID                (input)
   DWORD    dwDwellTime;            // Dwell time-out           (output)
   DWORD    dwDecayTime;            // Decay time-out           (output)
   DWORD    dwTargetLatencyTime;    // Response latency         (output)
   DWORD    dwTargetPowerConsumption; // % Power consumption    (output)
}DEVPARAMETERS;
```

The dwDriverID and dwDeviceID indicate which specific target device to return the parameters for.

The dwDwellTime field is the value in milliseconds from the time of last device activity until the device enters its power conservation mode. During this Dwell phase, the device is at full availability (minimum latency) where no delay occurs when it is accessed (maximum performance and maximum power consumption). This unsigned value is measured in milliseconds and can range from 0x00000000 to 0xFFFFFFFE (0 to 71582 minutes=zero to 1193 hours). Setting this field to 0xFFFFFFFF means that the device does not support a device time-out.

After the dwDwellTime has expired and the device has transitioned to its power conservation state, the dwDecayTime represents the amount of time before the device reaches its lowest power consumption state. During this decay phase, the device may not be immediately available because it may need to transition out of its power management state. There may be some performance impact during this phase. This dwDecayTime field is measured in milliseconds. This unsigned value is measured in milliseconds and can range from 0x00000000 to 0xFFFFFFFE (0 to 71582 minutes=zero to 1193 hours). Setting this field value to 0xFFFFFFFF indicates that the device does not support a "decay timeout". Setting this field to 0x00000000 means that after the Dwell timer has expired, the device will immediately enter its lowest power state.

It should be noted that some devices may simply go from a "Full On" state to a "Full Off" state, and may not use the dwDecayTime. These timeouts will return unsigned values in milliseconds from 0x00000000 to 0xFFFFFFFE (0 to 71582 minutes=zero to 1193 hours) only if the device is in "power managed" or "suspend" states. These timeouts will return 0xFFFFFFFF if the device is in the "on" state.

dwTargetLatencyTime is the amount of time (measured in milliseconds) that it takes a device to respond to a request. This is the amount of time due to power conservation measures required over and above the normal access time.

```
INT FAR PASCAL PMSendCommand(dwCmd, lpMem)
    DWORD      dwCmd;    // command type = PWR_GET_DEVICE_POWER_STATE
    LPVOID     lpMem;    // memory buffer pointer
``` dwTargetPowerConsumption represents the desired goal for a percentage of power presently being consumed that is within the device's minimum and maximum range. The range of power that can be consumed by the device can be obtained using the PWR_GET_DEVICE_CAPABILITIES function call. For example, if a device consumes no power at its minimum power state and 10 watts at its maximum power state, and the current consumption goal is 8 watts due to some sort of power conservation measure, this field would return 0x00000050 for 80%. This unsigned value is can range from 0% to 100%.

```
PMC Return(s):   PWRERR_OK
                 PWRERR_MEMORY_INSUFFICIENT
                 PWRERR_MEMORY_POINTER_INVALID
                 PWRERR_DRIVER_UNKNOWN
                 PWRERR_DEVICE_UNKNOWN
                 PWRERR_DEVICE_TIMEOUT
                 PWRERR_DEVICE_UNABLE
```

PWR_SET_DEVICE_PARAMETERS Function

```
INT FAR PASCAL PMSendCommand(dwCmd, lpMem)
    DWORD      dwCmd;    // command type = PWR_SET_DEVICE_PARAMETERS
    LPVOID     lpMem;    // memory buffer pointer
```

This function is used to set the parameters for the specified device. The parameters are sent to the PMC in the global memory structure listed below and passed to the target device driver by the PMC. The dwCmd parameter should be set to PWR_SET_DEVICE_PARAMETERS for this function. The lpMem parameter is a 32-bit pointer to a block of memory used to pass information to the PMC from the caller. The structure of that information is described in the DEVPARAMETERS structure outlined below.

PWR_GET_DEVICE_POWER_STATE Function

This function is used to get a device's present power state. The PMC retrieves this information by passing a request to the target device driver. The dwCmd parameter should be set to PWR_GET_DEVICE_POWER_STATE for this function.

The lpMem parameter is a 32-bit pointer to a block of memory used to return information to the caller. The structure of that information is described in the DEVPOWERSTATE structure outlined below. This memory buffer must be at least four bytes long to indicate the size of the buffer and to receive the size required for this function call. The caller may allocate a buffer four bytes long, set the wMemBufSize field to four, call this API function, and use the return value to determine just exactly how much memory is needed for the lpMem buffer by checking the wMemBufReturnSize field returned by the PMC.

```
typedef struct {
    WORD       wMemBufSize;              // Memory buffer length      (input)
    WORD       wMemBufReturnSize;        // Bytes returned in buffer  (output)
    DWORD      dwDriverID;               // Device driver ID          (input)
    DWORD      dwDeviceID;               // Device ID                 (input)
    DWORD      dwDwellTime;              // Dwell time-out            (input)
    DWORD      dwDecayTime;              // Decay time-out            (input)
    DWORD      dwTargetLatencyTime;      // Response latency          (input)
    DWORD      dwTargetPowerConsumption; // Power consumption         (input)
}DEVPARAMETERS;
PMC Return(s):   PWRERR_OK
                 PWRERR_MEMORY_INSUFFICIENT
                 PWRERR_MEMORY_POINTER_INVALID
                 PWRERR_DRIVER_UNKNOWN
                 PWRERR_DEVICE _UNKNOWN
                 PWRERR_DEVICE_TIMEOUT
                 PWRERR_DEVICE_INCAPABLE
                 PWRERR_DEVICE_UNABLE
```

```
#define      PWR_ON                  0    // "ON" PM state
#define      PWR_POWER_MANAGED       1    // "POWER MANAGED" PM state
#define      PWR_SUSPEND             2    // "SUSPEND" PM state
typedef struct {
    WORD     wMemBufSize;                 // Memory buffer size              (input)
    WORD     wMemBufReturnSize;           // Bytes returned in memory buffer (output)
    DWORD    dwDriverID;                  // Device driver's ID              (input)
    DWORD    dwDeviceID;                  // Device ID                       (input)
    WORD     wPMstate;                    // Current PM State                (output)
    DWORD    dwCountdownTime;             // Time left before timeout        (output)
    LONG     lPowerConsume;               // Present power consumption       (output)
}DEVPOWERSTATE;
PMC Return(s):   PWRERR_OK
                 PWRERR_MEMORY_INSUFFICIENT
                 PWRERR_MEMORY_POINTER_INVALID
                 PWRERR_DRIVER_UNKNOWN
                 PWRERR_DEVICE_UNKNOWN
                 PWRERR_DEVICE_TIMEOUT
                 PWRERR_DEVICE_INCAPABLE
                 PWRERR_DEVICE_UNABLE
```

PWR_SET_DEVICE_POWER_STATE Function

```
INT FAR PASCAL PMSendCommand(dwCmd, lpMem)
    DWORD   dwCmd;     // message type = PWR_SET_DEVICE_POWER_STATE
    LPVOID  lpMem;     // memory buffer pointer
```

This function is used to set a device's power state. The state is sent from the caller to the PMC in the global memory structure listed below. The PMC in turn passes this request to the target device driver identified by the dwDriverID and dwDeviceID fields of the data structure. The dwCmd parameter should be set to PWR_SET_DEVICE_POWER_STATE for this function. The lpMem parameter is a 32-bit pointer to a block of memory used to return information to the caller. The structure of that information is described in the SETDEVPOWERSTATE structure outlined below.

This function provides a software timer/alarm for the specified device. When the timer expires, the device driver's callback address is called from the PMC with PWR_SET_DEVICE_TIMER as the command. For example, if a device driver wants to measure inactivity for a particular device, it could set a PMC timer. If activity occurs on the device before the PMC alarm occurs, the device driver could cancel the current alarm, and set a new one. If activity does not occur on the particular device, the device driver could change the device's power state when the PMC alarm occurs.

```
#define      PWR_ON                  0    // "ON" PM state
#define      PWR_POWER_MANAGED       1    // "POWER MANAGED" PM state
#define      PWR_SUSPEND             2    // "SUSPEND" PM state
typedef struct {
    WORD     wMemBufSize;                 // Memory buffer length            (input)
    WORD     wMemBufReturnSize;           // Bytes returned in memory buffer (output)
    DWORD    dwDriverID;                  // Device driver ID                (input)
    DWORD    dwDeviceID;                  // Device ID                       (input)
    WORD     wPMstate;                    // Desired power state             (input)
}SETDEVPOWERSTATE;
PMC Return(s):   PWRERR_OK
                 PWRERR_MEMORY_INSUFFICIENT
                 PWRERR_MEMORY_POINTER_INVALID
                 PWRERR_DRIVER_UNKNOWN
                 PWRERR_DEVICE_UNKNOWN
                 PWRERR_DEVICE_TIMEOUT
                 PWRERR_DEVICE_INCAPABLE
                 PWRERR_DEVICE_UNABLE
```

PWR_SET_DEVICE_TIMER Function

```
INT FAR PASCAL PMSendCommand(dwCmd, lpMem)
    DWORD   dwCmd;     // command type = PWR_SET_DEVICE_TIMER
    LPVOID  lpMem      // memory buffer pointer
```

This API is provided to limit the number of global timers required for power management. There is a limited number of timers that Windows provides (32 available), and using this PMC API timer function for power management issues leaves more available for general purpose. This timer function is implemented by managing one of the standard Windows timers. Canceling a previously set timer callback (alarm) is done by calling this function with a valid Timer ID and the timer value set to 0. The dwCmd parameter of this function should be set to PWR_SET_DEVICE_TIMER.

The lpMem parameter is a 32-bit pointer to a block of memory used to return information to the caller. The structure of that information is described in the DEVICETIMER structure outlined below. This memory buffer must be at least four bytes long to indicate the size of the buffer and to receive the size required for this function call. The caller may allocate a buffer four bytes long, set the wMemBufSize field to four, call this API function, and use the return value to determine just exactly how much memory is needed for the lpMem buffer by checking the wMemBufReturnSize field returned by the PMC.

The lpMem parameter is a 32-bit pointer to a block of memory used to return information to the caller. The structure of that information is described in the SYSPOWERSTATUS structure outlined below. This memory buffer must be at least four bytes long to indicate the size of the buffer and to receive the size required for this function call. The caller may allocate a buffer four bytes long, set the wMemBufSize field to four, call this API function, and use the return value to determine just exactly how much memory is needed for the lpMem buffer by checking the wMemBufReturnSize field returned by the PMC.

```
typedef struct }
    WORD        wMemBufSize;        // Memory buffer size              (input)
    WORD        wMemBufReturnSize;  // Bytes returned in memory buffer (output)
    DWORD       dwDriverID;         // Driver ID                       (input)
    DWORD       dwDeviceID;         // Device ID                       (input)
    WORD        wSoftwareType;      // Software type                   (input)
    DWORD       dwTimeValue;        // Alarm time (seconds)            (input)
    WORD        wTimerID;           // Assigned timer ID               (input/output)
    FARPROC     TimerProc;          // Call back address of timer proc (input)
    WORD        wPM32_Sel;          // 32-bit windows selector         (input)
}DEVICETIMER;
PMC Return(s):  PWRERR_OK
                PWRERR_MEMORY_INSUFFICIENT
                PWRERR_MEMORY_POINTER_INVALID
                PWRERR_DRIVER_UNKNOWN
                PWRERR_DEVICE_UNKNOWN
                PWRERR_TIMER_DATA_INVALID
                PWRERR_TIMER_FAIL
                PWRERR_TIMER_INVALID
```

PWR_GET_SYSTEM_POWER_STATUS
Function

```
INT FAR PASCAL PMSendCommand(dwCmd, lpMem)
    DWORD    dwCmd;    // command type = PWR_GET_SYSTEM_POWER_STATUS
    LPVOID   lpMem;    // memory buffer pointer
```

This function retrieves information for the system's current power status. This information will be gathered from the APM BIOS if one exists on the system. If the system does not support an APM BIOS, an error is returned from this call. The dwCmd parameter should be set to PWR_GET_SYSTEM_POWER_STATUS for this function.

```
typedef struct {
    WORD    wMemBufSize;        // Memory buffer size              (input)
    WORD    wMemBufReturnSize;  // Bytes returned in memory buffer output)
    WORD    wPowerSource;       // Power source                    (output)
    WORD    wBatteryStatus;     // Battery status                  (output)
    WORD    wBatteryLifeP;      // % Remaining battery life        (output)
```

-continued

| | | | |
|---|---|---|---|
| WORD | wBatteryLifeT; | // Time battery life remaining | (output) |

}SYSPOWERSTATUS;
PMC Return(s): PWRERR_OK
PWRERR_MEMORY_POINTER_INVALID
PWRERR_MEMORY_INSUFFICIENT
PWRERR_APM_NOT_INSTALLED

PWR_SYSTEM_POWER_EVENT Function

```
INT FAR PASCAL PMSendCommand(dwCmd, lpMem)
    DWORD    dwCmd;    // command type = PWR_SYSTEM_POWER_EVENT
    LPVOID   lpMem;    // memory buffer pointer
```

The PWR_SYSTEM_POWER_EVENT is used to request power management state changes. This message is sent to the target driver's callback procedure with the associated memory buffer. The event to be processed is contained in the wPowerEvent field of the memory buffer. The dwCmd parameter should be set to PWR_SYSTEM_POWER_EVENT for this function.

The lpMem parameter is a 32-bit pointer to a block of memory used to return information to the caller. The structure of that information is described in the POWEREVENT structure outlined below. This memory buffer must be at least four bytes long to indicate the size of the buffer and to receive the size required for this function call.

The lpMem parameter is a 32-bit pointer to a block of memory used to return information to the caller. The structure of that information is described in the DRIVERLIST structure outlined below. This memory buffer must be at least four bytes long to indicate the size of the buffer and to receive the size required for this function call. The caller may allocate a buffer four bytes long, set the wMemBufSize field to four, call this API function, and use the return value to determine just exactly how much memory is needed for the lpMem buffer by checking the wMemBufReturnSize field returned by the PMC.

```
typedef struct {
    WORD     wMemBufSize;        // Memory buffer size              (input)
    WORD     wMemBufReturnSize;  // Bytes returned in memory buffer (output)
    DWORD    dwDriverID;         // Driver ID of caller             (input)
    DWORD    dwDeviceID;         // Device ID of caller             (input)
    WORD     wPowerEvent;        // Power event                     (input)
}POWEREVENT;
PMC Return(s):  PWRERR_OK
                PWRERR_MEMORY_INSUFFICIENT
                PWRERR_MEMORY_POINTER_INVALID
                PWRERR_DRIVER_UNKNOWN
                PWRERR_DEVICE_UNKNOWN
                PWRERR_EVENT_INVALID
```

PWR_GET_DRIVER_LIST Function

```
INT FAR PASCAL PMSendCommand(dwCmd, lpMem)
    DWORD    dwCmd;    // command type = PWR_GET_DRIVER_LIST
    LPVOID   lpMem;    // memory buffer pointer
```

The list of registered PM-aware device drivers is returned from the PMC in the global memory structure defined below as a result of this call. These drivers registered with the PMC to provide and receive power management information to/from the PMC. The dwCmd parameter should be set to PWR_GET_DRIVER_LIST for this function.

```
#define DRV_NAME_LEN 128
typedef struct {
    DWORD    dwDriverID;                  // Driver ID             (output)
    char     cDriverName[DRV_NAME_LEN];   // Driver name string    (output)
    WORD     wRevision;                   // BCD version number    (output)
```

-continued

```
}DRIVERINFO;
typedef struct {
    WORD        wMemBufSize;            // Memory buffer size        (input)
    WORD        wMemBufReturnSize;      // Bytes returned in buffer  (output)
    WORD        wNumDrivers;            // # of drivers returned     (output)
    DRIVERINFO  stDriverInfo[];         // Driver/device records     (output)
}DRIVERLIST;
PMC Return(s):  PWRERR_OK
                PWRERR_MEMORY_INSUFFICIENT
                PWRERR_MEMORY_POINTER_INVALID
```

PWR_GET_DEVICE_LIST Function

```
INT FAR PASCAL PMSendCommand(dwCmd, lpMem)
    DWORD    dwCmd;    // command type = PWR_GET_DEVICE_LIST
    LPVOID   lpMem;    // memory buffer pointer
```

The list of registered devices is returned from the PMC in the global memory structure defined below as a result of this call. The dwCmd parameter should be set to PWR_GET_DEVICE_LIST for this function.

The lpMem parameter is a 32-bit pointer to a block of memory used to return information to the caller. The structure of that information is described in the DEVICELIST structure outlined below. This memory buffer must be at least four bytes long to indicate the size of the buffer and to receive the size required for this function call. The caller may allocate a buffer four bytes long, set the wMemBufSize field to four, call this API function, and use the return value to determine just exactly how much memory is needed for the lpMem buffer by checking the wMemBufReturnSize field returned by the PMC.

with the PMC to enhance or replace functionality of the default PMC. The dwCmd parameter should be set to PWR_GET_EXTENSION_LIST for this function.

The lpMem parameter is a 32-bit pointer to a block of memory used to return information to the caller. The structure of that information is described in the EXTENSIONLIST structure outlined below. This memory buffer must be at least four bytes long to indicate the size of the buffer and to receive (he size required for this function call. The caller may allocate a buffer four bytes long, set the wMemBufSize field to four, call this API function, and use the return value to determine just exactly how much memory is needed for the lpMem buffer by checking the wMemBufReturnSize field returned by the PMC.

```
#define MAX_NAME_LEN 40
typedef struct {
    DWORD       dwDriverID;                      // Device driver ID         (output)
    DWORD       dwDeviceID;                      // Device ID                (output)
    DWORD       dwDeviceType;                    // Device type              (output)
    char        cDeviceString[MAX_NAME_LEN];     // Device string            (output)
    char        cDeviceName[MAX_NAME_LEN];       // Device Name              (output)
    WORD        wSoftwareType;                   // Software type            (output)
}DEVICEINFO;
typedef struct {
    WORD        wMemBufSize;                     // Memory buffer size       (input)
    WORD        wMemBufReturnSize;               // Bytes returned in buffer (output)
    WORD        wNumDevices;                     // # of devices returned    (output)
    DEVICEINFO  stDeviceInfo[];                  // Device records           (output)
}DEVICELIST;
PMC Return(s):  PWRERR_OK
                PWRERR_MEMORY_INSUFFICIENT
                PWRERR_MEMORY_POINTER_INVALID
```

PWR_GET_EXTENSION_LIST Function

```
INT FAR PASCAL PMSendCommand(dwCmd, lpMem)
    DWORD    dwCmd;    // command type = PWR_GET_EXTENSION_LIST
    LPVOID   lpMem;    // memory buffer pointer
```

The list of registered PMC extension drivers is returned from the PMC in the global memory structure defined below as a result of this call. These PMC extension drivers register

```
#define DRV_NAME_LEN 128
typedef struct {
    DWORD           dwDriverID;                      // Driver ID                   (output)
    WORD            wExtensionType;                  // Extension driver type       (output)
    char            cDriverName[DRV_NAME_LEN];       // Driver name string          (output)
    WORD            wRevision;                       // BCD version number          (output)
    WORD            wSoftwareType;                   // Software type               (output)
}EXTENSIONINFO;
typedef struct {
    WORD            wMemBufSize;                     // Memory buffer size          (input)
    WORD            wMemBufReturnSize;               // Bytes returned in buffer    (output)
    WORD            wNumDrivers;                     // # of drivers returned       (output)
    EXTENSIONINFO   stExtensionInfo[];               // Driver records              (output)
}EXTENSIONLIST;
PMC Return(s):  PWRERR_OK
                PWRERR_MEMORY_INSUFFICIENT
                PWRERR_MEMORY_POINTER_INVALID
```

PWR_SHOW_USER_MESSAGE Function

```
INT FAR PASCAL PMSendCommand(dwCmd, lpMem)
    DWORD    dwCmd;     // command type = PWR_SHOW_USER_MESSAGE
    LPVOID   lpMem;     // memory buffer pointer
```

The PWR_SHOW_USER_MESSAGE is used to display a message to the user on behalf of a target device driver or application, accept a response from the user and return that response to the target device driver. For example, a target device driver could use this API when a global Suspend event is broadcast and the target device driver needs user confirmation before it proceeds with either accepting or rejecting the event. This API function provides a common look and feel to all such power management messages generated by target device drivers. This function is provided to minimize user interface coding by device drivers.

Device drivers are not required to use this function and may create their own message boxes relative to specific needs. Calls into the Ring-3 portion of the PMC (PMC.DRV) display a formatted, windowed, dialog box using Windows API calls. Calls into the Ring-0 portion of the PMC (VPMC.386) produce a blue screen with text displayed in the middle portion of the screen. Icons and pushbuttons are not displayed on the blue screen.

The dwCmd parameter should be set to PWR_SHOW_USER_MESSAGE for this function. The lpMem parameter is a 32-bit pointer to a block memory used to return information to the caller. The structure of that information is described in the USERMESSAGE structure outlined below. This memory buffer must be at least four bytes long to indicate the size of the buffer and to receive the size required for this function call.

```
#define MAXMSGTEXT 128
typedef struct {
    WORD    wMemBufSize;                 // Memory buffer length       (input)
    WORD    wMemBufReturnSize;           // Bytes returned in buffer   (output)
    DWORD   dwDriverID;                  // Driver ID                  (input)
    DWORD   dwDeviceID;                  // Device ID                  (input)
    char    cUserMsg[MAXMSGTEXT];        // Message to be displayed    (input)
    WORD    wButtonType;                 // Push button type           (input)
    WORD    wIconType;                   // Icon type for message box  (input)
    WORD    wMsgFlags;                   // Message box option flags   (input)
    WORD    wBeep;                       // Audible beep               (input)
    WORD    wWaitTime;                   // Max wait time for response (input)
    WORD    wUserResponse;               // User response              (output)
}USERMESSAGE;
PMC Return(s):  PWRERR_OK
                PWRERR_MEMORY_INSUFFICIENT
                PWRERR_MEMORY_POINTER_INVALID
                PWRERR_MESSAGE_BOX_INVALID
```

PWR_GET_CALLBACK_ADDR_LIST Function

```
INT FAR PASCAL PMSendCommand(dwCmd, lpMem)
    DWORD    dwCmd;     // command type = PWR_GET_CALLBACK_ADDR_LIST
    LPVOID   lpMem;     // memory buffer pointer
```

The list of registered devices is returned from the PMC in the global memory structure defined below as a result of this call. The dwCmd parameter should be set to PWR_GET_CALLBACK_ADDR_LIST for this function.

The lpMem parameter is a 32-bit pointer to a block of memory used to return information to the caller. The structure of that information is described in the DEVICELIST structure outlined below. This memory buffer must be at least four bytes long to indicate the size of the buffer and to receive the size required for this function call. The caller may allocate a buffer four bytes long, set the wMemBufSize field to four, call this API function, and use the return value to determine just exactly how much memory is needed for the lpMem buffer by checking the wMemBufReturnSize field returned by the PMC.

```
typedef struct
    DWORD         dwDriverID;          // Device's Driver ID         (output)
    DWORD         dwDeviceID;          // Device's Device ID         (output)
    FARPROC       lpCallBackAddr;      // Callback Address           (output)
    WORD          wPM32_Sel;           // 32-bit Windows selector    (output)
}CALLBACKRECORD;
typedef struct {
    WORD              wMemBufSize;        // Memory buffer size           (input)
    WORD              wMemBufReturnSize;  // Bytes returned in buffer     (output)
    DWORD             dwCallerID;         // Caller's ID                  (input)
    WORD              wSoftwareType;      // Clients' class (0 for all)   (input)
    DWORD             dwReserved;         // Reserved - always set to 0   (input)
    WORD              wNumClients;        // # of clients returned        (output)
    CALLBACKRECORD    CallBackRecord[];   // Callback Address records     (output)
}CALLBACKLIST;
PMC Return(s):   PWRERR_OK
                 PWRERR_MEMORY_INSUFFICIENT
                 PWRERR_MEMORY_POINTER_INVALID
                 PWRERR_DEVICE_INCAPABLE
```

The preferred embodiment of the present invention, a flexible power management system enabling power management for add-in devices (and system components) using a uniform power management communication protocol and also enabling power management events to originate from applications, is thus described. While the present invention has been described in particular embodiments, it should be appreciated that the present invention should not be construed as limited by such embodiments, but rather construed according to the below claims.

What is claimed is:

1. In a computer system including a bus for communicating address and data information, a central processor coupled to said bus for executing instructions and processing data, and memory coupled to said bus for containing information, a power management coordinator, said coordinator comprising:

a power management core for communication of power management information with system devices within said computer system under a uniform power management protocol, wherein particular of said system devices are add-in devices requiring power management, and wherein one of said add-in devices provides programmable dwell time and decay time periods for power management of said add-in devices.

a plurality of power management clients coupled to communicate with said power management core, wherein particular of said clients are associated with said add-in devices;

wherein power events are generated by said clients and broadcast by said power management core to said plurality of power management clients; and wherein one of said power management clients comprises a power event sequencer for maintaining a particular sequence for communication of said power events.

2. In a computer system including a bus for communicating address and data information, a central processor coupled to said bus for executing instructions and processing data, and memory coupled to said bus for containing information, a power management coordinator, said coordinator comprising:

a power management core for communication of power management information with system devices within said computer system under a uniform power management protocol, wherein particular of said system devices are add-in devices requiring power management;

a plurality of power management clients coupled to communicate with said power management core, wherein particular of said clients are associated with said add-in devices, and wherein one of said plurality of clients is a power policy manager comprising:
    means for allowing selection of a power managed state between performance and economy for operation of said computer system; and
    means for communicating said power managed state to clients using said uniform power management protocol;

and wherein said power management coordinator further comprises:
    means for translating said uniform power management protocol for an individual add-in device; and
    means for adjusting, within an individual add-in device, its dwell time and decay time periods in accordance with said power managed state; and wherein power events are generated by said clients and broadcast by said power management core to said plurality of power management clients; and wherein one of said power management clients comprises power event sequencer for maintaining a particular sequence for communication of said power events.

3. A power management coordinator as described in claim 2 wherein said add-in devices provide programmable dwell time and decay time periods for power management of said add-in devices.

4. In a computer system including a bus for communicating address and data information, a central processor coupled to said bus for executing instructions and processing data, memory coupled to said bus for containing information, and a plurality of system devices including add-in devices coupled to communicate within said computer system, a power management coordinator comprising:

a plurality of power management device drivers coupled to communicate with said add-in devices:

power management means coupled to communicate with said plurality of power management devices drivers, said power management means for receiving power management communications from originator clients and for routing said communications to destination devices drivers; and power policy manager means coupled to communicate with said power management means, said power policy manager means for issuing power management events for said add-in devices utilizing a uniform power management protocol adopted by said device drivers; and wherein said add-in devices provide programmable dwell time and decay time periods.

5. The power management coordinator as described in claim 4 wherein said power policy manager means comprises:

means for allowing selection of a power managed state between performance and economy for operation of said computer system; and means for communicating said power managed state to said device drivers and, in response thereto, individual add-in devices adjust associated dwell time and decay time periods.

6. In a computer system including a plurality of system devices including add-in devices coupled to communicate within said computer system and having individual programmable dwell time and decay time periods, a method of power management comprising the steps of:

providing a communication channel for routing power management commands that utilize a uniform power management protocol;

registering a plurality of device drivers to said communication channel wherein individual device drivers are associated with individual add-in devices of said computer system;

communicating power management events across said communication channel between device drivers:

registering a power policy manager with said communication channel;

controlling power states of said add-in devices by communicating power management events across said communication channel between said power policy manager and said device drivers and allowing selection of a power managed state between performance and economy for operation of said computer system;

communicating said power managed state to said device drivers using said uniform power management protocol;

translating said power managed state to dwell time and decay time periods of an individual add-in device; and adjusting individual dwell time and decay time periods of said individual add-in device in accordance with said power managed state.

7. In a computer system including a plurality of system devices including add-in devices coupled to communicate within said computer system and wherein said add-in devices have individual programmable dwell time and decay time periods a method of power management comprising the steps of:

providing a communication channel for routing power management commands that utilize a uniform power management protocol;

registering a plurality of device drivers to said communication channel wherein individual device drivers are associated with individual add-in devices of said computer system;

providing an application program in said computer system, said application program interfaced to communicate with said communicating channel;

controlling power states of said add-in devices by communicating power management events originating from said application program across said communication channel to said plurality of add-in devices;

registering a power policy manager with said communication channel;

controlling power states of said add-in devices by communicating power management events originating from said power policy manager across said communication channel to said plurality of add-in devices; and allowing selection of a power managed state between performance and economy for operation of said computer system;

communicating said power managed state to said device drivers using said uniform power management protocol;

translating said power managed state to dwell time and decay time periods of an individual add-in device; and adjusting individual dwell time and decay time periods of said individual add-in device in accordance with said power managed state.

8. In a computer system having a central processor for executing instructions and processing data including running applications programs, memory storing information, and a plurality of system devices including add-in devices, a power management coordinator comprising:

a power management device driver associated with each of said add-in devices, said device driver containing power management information specific to controlling the power consumption of its associated device;

one or more power management modules for providing power management for use in said computer system a power management core communicating with each of said device drivers and each of said modules and including:

means for supplying a unique identifier for each of said device drivers and modules;

means for allowing communication between any two or more of said device drivers and said modules; and means for allowing said applications programs to communicate with one or more of said device drivers and modules.

9. The system of claim 8 wherein one of said modules is a thermal budgeter for maintaining a record of heat generation of said system deices and for controlling distribution of system power based on said heat generation of said system devices and heat dissipation of said computer system.

10. The system of claim 8 wherein one of said modules is a power budgeter for monitoring power consumption of said system devices and for allocating system power based on the power supply capacity of said computer system.

11. The system of claim 10 wherein said computer system further includes a battery source and wherein said power budgeter is also for monitoring an energy level of said battery source to determine said power supply capacity of said computer system.

12. The system of claim 10 wherein said computer system further includes a power source and wherein said power budgeter is also for monitoring an energy level of said power source to determine said power supply capacity of said computer system.

13. The system of claim 8 wherein one of said modules is a power policy manager for monitoring activity of said devices and for initiating power events that are broadcast over said power management core.

14. In a computer system having a plurality of system devices including add-in devices, a power management device driver associated with each of said add-in devices, said device driver containing power management information specific to controlling the power consumption of its associated device, one or more modules for providing power management for use in said computer system and a power management core communicating with each of said device drivers and each of said modules, said device drivers and modules being able to generate receive and execute power events, a method of power management comprising the steps of:

registering said plurality of device drivers and modules with said power management core;

generating a power event by a first client;

directing said generated power event to all other device drivers and modules; and causing all devices and modules to execute said event.

15. The method of claim 14 wherein said step of registering said plurality of devices drivers and modules with said power management core includes the steps of: communicating a data structure to said core, said data structure containing information relating to power management for said device or module; and assigning a unique identifier for said device or module.

16. The method of claim 14 wherein said step of generating a power event by a first client includes the following steps:

generating a predetermined data structure containing values for predetermined parameters to be communicated to said core;

communicating said parameters to said core.

* * * * *